United States Patent
Douglas

(10) Patent No.: US 12,361,387 B1
(45) Date of Patent: Jul. 15, 2025

(54) SYSTEMS AND METHODS FOR INTEGRATED APPLICATION AND SCHEDULING PLATFORM WITH EFFICIENT AND ACCURATE MATCHING

(71) Applicant: DearHire Inc., Hollywood, FL (US)

(72) Inventor: Ryan Douglas, Hollywood, FL (US)

(73) Assignee: DearHire Inc., Hollywood, FL (US)

( * ) Notice: Subject to any disclaimer, the term of this patent is extended or adjusted under 35 U.S.C. 154(b) by 0 days.

(21) Appl. No.: 19/025,728

(22) Filed: Jan. 16, 2025

Related U.S. Application Data

(60) Provisional application No. 63/650,932, filed on May 23, 2024, provisional application No. 63/649,333, filed on May 18, 2024.

(51) Int. Cl.
| | |
|---|---|
| G06Q 10/1093 | (2023.01) |
| G06F 21/64 | (2013.01) |
| G06F 40/289 | (2020.01) |
| G06Q 10/0631 | (2023.01) |
| G06Q 10/1053 | (2023.01) |

(52) U.S. Cl.
CPC ......... *G06Q 10/1093* (2013.01); *G06F 21/64* (2013.01); *G06F 40/289* (2020.01); *G06Q 10/063112* (2013.01); *G06Q 10/1053* (2013.01)

(58) Field of Classification Search
None
See application file for complete search history.

(56) References Cited

U.S. PATENT DOCUMENTS

| | | | |
|---|---|---|---|
| 2019/0019159 A1* | 1/2019 | Champaneria | H04W 4/14 |
| 2019/0220824 A1* | 7/2019 | Liu | G06Q 10/063112 |
| 2021/0295238 A1* | 9/2021 | Poon | G06Q 10/1053 |
| 2022/0067665 A1* | 3/2022 | Westerheide | G06N 20/00 |
| 2022/0245512 A1* | 8/2022 | Talanine | G06Q 10/1053 |

OTHER PUBLICATIONS

A. Julian and H. K, "NLP based Resume Analysis and Adaptive Skill Assessment System," 2024 3rd International Conference for Innovation in Technology (INOCON), Bangalore, India, 2024, pp. 1-5 (Year: 2024).*

(Continued)

*Primary Examiner* — Laura Yesildag
(74) *Attorney, Agent, or Firm* — Scale LLP

(57) ABSTRACT

Disclosed are methods, systems and non-transitory computer readable memory for integrated application and scheduling platform with efficient and accurate matching. For instance, a method may include receiving a comprehensive job application from a candidate via a web-based interface, storing the application data in a centralized repository, matching the candidate with job listings using a dynamic processing unit based on multi-dimensional criteria, displaying a prioritized list of job matches to the candidate, enabling the candidate to directly schedule a first-round interview through a real-time scheduling interface, and providing automated reminders about the scheduled interviews. The method streamlines the recruitment process by combining application submission, matching, and interview scheduling into a single integrated system, improving efficiency for both candidates and employers.

20 Claims, 16 Drawing Sheets

(56) References Cited

OTHER PUBLICATIONS

B. V. Pendyala, N. Atrey, et al."Artificial Intelligence Enabled, Social Media Leveraging Job Matching System for Employers and Applicants," 2022 International Conference on Recent Trends in Microelectronics, Automation, Computing and Communications Systems (ICMACC), Hyderabad, India, 2022,pp. 422-442 (Year: 2022).*

C. Z. Elgammal, A. Barmu, H. Hassan, K. Elgammal, T. Özyer and R. Alhajj, "Matching Applicants with Positions for Better Allocation of Employees in the Job Market," 2021 22nd International Arab Conference on Information Technology (ACIT), Muscat, Oman, 2021 (Year: 2021).*

D. B. L. Prasad, K. Srividya, K. et al. "An Advanced Real-Time Job Recommendation System and Resume Analyser," 2023 International Conference on Self Sustainable Artificial Intelligence Systems (ICSSAS), Erode, India, 2023 (Year: 2023).*

* cited by examiner

200 FIG. 2

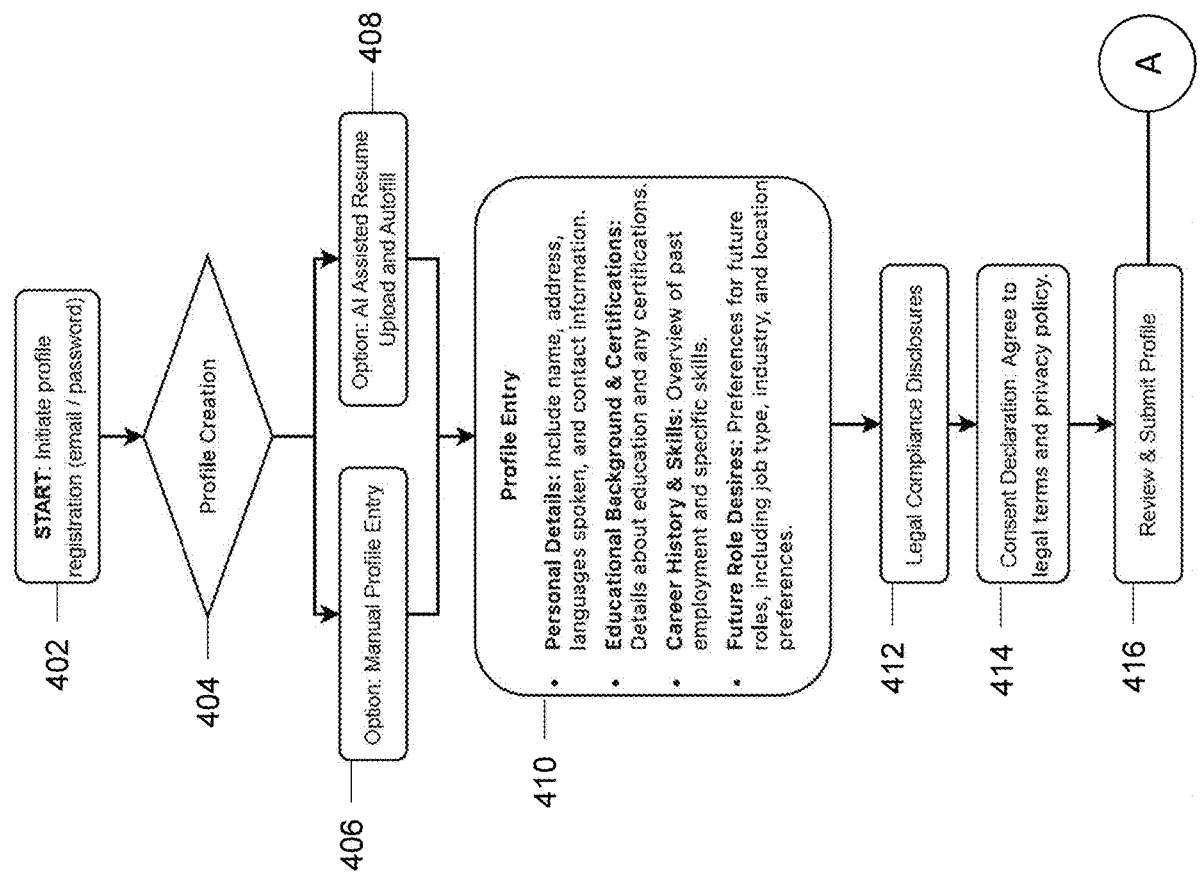
400 FIG. 4

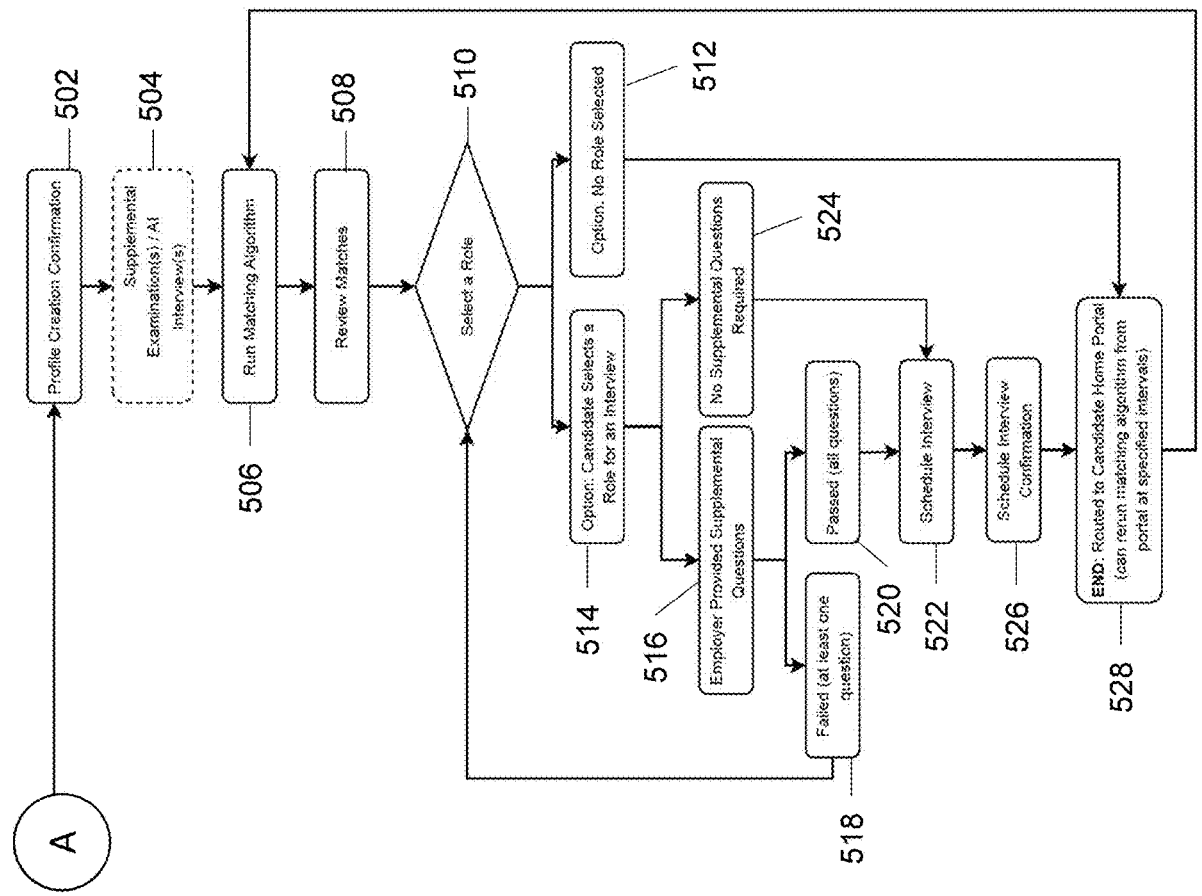

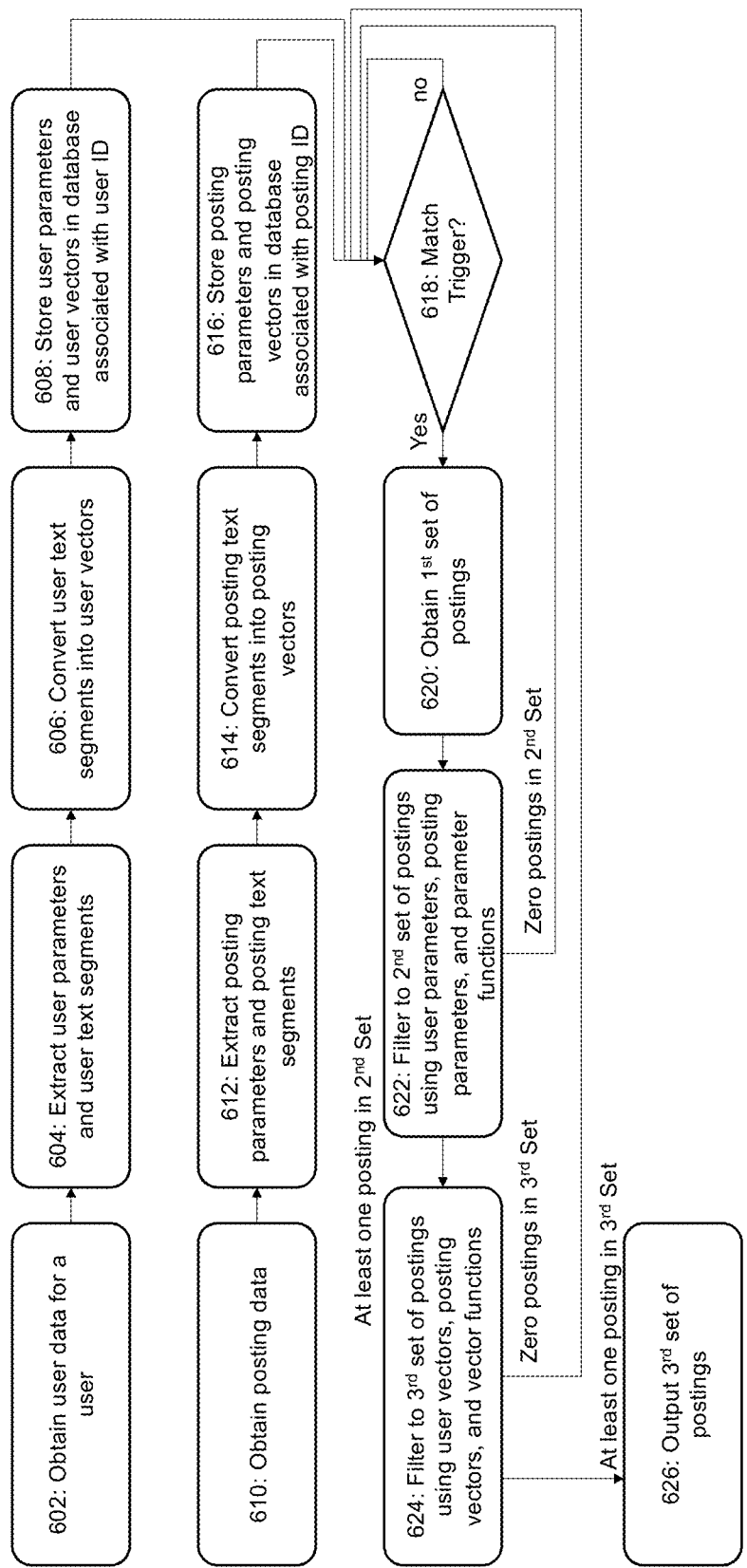
600 FIG. 6

700A

📧 DearHire

| Didn't See Anything You Liked? - Got to Candidate Home |

Congratulations! Explore Your Role Matches and Choose an Interview Opportunity!

Take a look at the available roles below and select the one you'd like to interview for by clicking "View Role Details" and then "Choose for Interview."

If you have other roles in mind that interest you, you can show your preference by clicking the star icon. Your feedback helps us tailor your experience.

Role Match #1

| Employer | Job Title | Location (City/State) | Role Type | Workplace Type | Department | |
|---|---|---|---|---|---|---|
| test | Test Role | Baltimore, Maryland | Part-time | Remote | Accounts Payable/Receivable | ☆ Click for Role Details |

Role Match #2

| Employer | Job Title | Location (City/State) | Role Type | Workplace Type | Department | |
|---|---|---|---|---|---|---|
| test | Test Role | Baltimore, Maryland | Part-time | Remote | Accounts Payable/Receivable | ☆ Click for Role Details |

Role Match #3

| Employer | Job Title | Location (City/State) | Role Type | Workplace Type | Department | |
|---|---|---|---|---|---|---|
| test | Test Role | Baltimore, Maryland | Full-time | On-site | Accounting | ☆ Click for Role Details |

Role Match #4

🦌 DearHire  | Didn't See Anything You Liked? - Got to Candidate Home |

| test | sdvdsv | Baltimore, Maryland | Part-time | Remote | Accounts Payable/Receivable | ↓ Click for Role Details |

Role Details

Employer:
test

Job Title:
Test Role

Role Description
sdvsdv

Preferred Skills
   Database Management;Data Visualization

Preferred Certifications

Employer Profile
   Test Profile
Employer Site Link

Additional Information
 Please Review Employer Primary Policy:

Disclosed Annual Salary Range (If provided):

$0 USD    to $0 USD

Select for Interview

DearHire

- Home
- Check for New Matches (Available in 6d 23h 57m 9s)
- Profile
- Dive Feedback
- Need Help
- Change Password Logout

Welcome, Dear Hire!

Name of User

| Number of Interviews You've Rescheduled | Number of Unique Roles Matched | Number of Active Roles in the Marketplace | Date Joined |
|---|---|---|---|
| 2 | 10 | 899 | March 1, 2024 |

Your Upcoming Interviews  Previous Week  May 19, 2024 - May 25, 2024  Next Week  (Timezone: Asia/Hong_Kong)

| 19 May,2024 | 20 May,2024 | 21 May,2024 | 22 May,2024 | 23 May,2024 | 24 May,2024 | 25 May,2024 |
|---|---|---|---|---|---|---|
| | | 1 Hour Interview: 4:00 PM - 5:00 PM | | | | |

Role Category Analysis

(---- Watches :)

4.0
3.5
3.0
2.5
2.0

Most in Demand Skills

FIG. 7G

SYSTEMS AND METHODS FOR INTEGRATED APPLICATION AND SCHEDULING PLATFORM WITH EFFICIENT AND ACCURATE MATCHING

CROSS-REFERENCE TO RELATED APPLICATION(S)

This application claims the benefit of U.S. Provisional Application No. 63/650,932, filed May 23, 2024, and U.S. Provisional Application No. 63/649,333, filed May 18, 2024.

The contents of each of the above referenced applications are hereby incorporated by reference in their entirety.

TECHNICAL FIELD

Various aspects of the present disclosure relate generally to systems and methods for integrated application and scheduling platform and, more particularly, to systems and methods for integrated application and scheduling platform with efficient and accurate matching.

BACKGROUND

The job application and recruitment landscape has undergone significant changes in recent years, driven by technological advancements and evolving workforce dynamics. Traditional methods of job searching and application submission often involve time-consuming processes where candidates must individually search for opportunities, tailor applications for each position, and submit them through various platforms or employer websites. This fragmented approach can lead to inefficiencies for both job seekers and employers.

For job seekers, the process of searching for relevant opportunities, preparing multiple applications, and managing various application statuses across different platforms can be overwhelming and time-consuming. Additionally, the lack of transparency in the application process and limited feedback from employers can lead to frustration and decreased motivation in the job search.

From the employer's perspective, managing a large volume of applications, identifying qualified candidates, and coordinating interviews can be resource-intensive tasks. The manual review of applications and resumes may introduce errors, unintended biases, and overlook qualified candidates. Furthermore, the scheduling of interviews often involves back-and-forth communications, leading to delays in the hiring process.

The present disclosure is directed to overcoming one or more of these above-referenced challenges.

SUMMARY OF THE DISCLOSURE

According to certain aspects of the disclosure, systems, methods, and computer readable memory are disclosed for integrated application and scheduling platform with efficient and accurate matching.

In some cases, a system for integrated application and scheduling platform with efficient and accurate matching includes: a user interface facilitating application submission, match display, and scheduling; a database to store and manage access to candidate profiles, job listings, and scheduling data; and a matching and scheduling module designed to automate the matching process and facilitate direct interview scheduling based on real-time employer availability.

In some cases, a computer-implemented method for integrated job application processing and interview scheduling includes: receiving, by a processor, user data for a candidate through a user interface; extracting, by the processor, user parameters and user text segments from the user data; converting, by the processor, the user text segments into user vectors using vectorization techniques; storing, by the processor, the user parameters and user vectors in a database associated with a user ID; obtaining, by the processor, posting data for job listings; extracting, by the processor, posting parameters and posting text segments from the posting data; converting, by the processor, the posting text segments into posting vectors using vectorization techniques; storing, by the processor, the posting parameters and posting vectors in the database associated with a posting ID; evaluating, by the processor, a match trigger to initiate a matching process; upon detecting the match trigger, obtaining, by the processor, a first set of postings; filtering, by the processor, the first set of postings to a second set of postings using the user parameters, posting parameters, and parameter functions; filtering, by the processor, the second set of postings to a third set of postings using the user vectors, posting vectors, and vector functions; outputting, by the processor, the third set of postings through the user interface; receiving, by the processor, a selection of a job posting from the third set of postings; retrieving, by the processor, real-time availability data for an employer associated with the selected job posting; presenting, by the processor, available interview time slots based on the real-time availability data; receiving, by the processor, a selection of an interview time slot; scheduling, by the processor, an interview for the selected time slot; sending, by the processor, automated notifications to the candidate and the employer about the scheduled interview; collecting, by the processor, post-interview feedback from the candidate and the employer; and updating, by the processor, the matching process based on the collected feedback to improve future matching accuracy.

Additional objects and advantages of the disclosed technology will be set forth in part in the description that follows, and in part will be apparent from the description, or may be learned by practice of the disclosed technology.

It is to be understood that both the foregoing general description and the following detailed description are exemplary and explanatory only and are not restrictive of the disclosed technology, as claimed.

BRIEF DESCRIPTION OF THE DRAWINGS

The accompanying drawings, which are incorporated in and constitute a part of this specification, illustrate various exemplary aspects and together with the description, serve to explain the principles of the disclosed technology.

FIG. 4 illustrates a flowchart of a method for user profile creation and submission in a application system, according to aspects of the present disclosure.

FIG. 5 illustrates a flowchart of a method for application processing and scheduling, according to aspects of the present disclosure.

FIG. 6 illustrates a flowchart of a method for efficient and accurate matching of user data and postings, according to aspects of the present disclosure.

FIGS. 7A-7I depict graphical user interfaces of a platform, according to aspects of the present disclosure.

DETAILED DESCRIPTION

Figure 1:
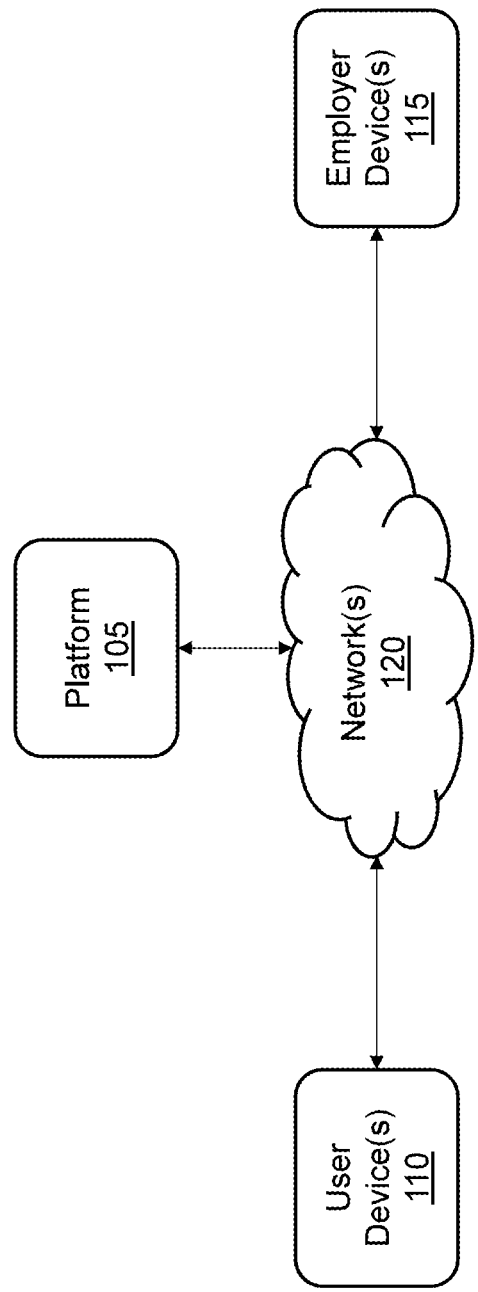
FIG. 1 illustrates an environment for an integrated application processing and scheduling platform, according to aspects of the present disclosure.

As the job market becomes increasingly competitive and dynamic, there is a growing need for more efficient and streamlined processes that can benefit both job seekers and employers. Existing solutions often focus on specific aspects of the recruitment process, such as job posting or resume parsing, without fully integrating the entire workflow from application submission to interview scheduling. This fragmentation can lead to inefficiencies and missed opportunities for both candidates and employers.

There is a need for comprehensive solutions that can address the challenges faced by both job seekers and employers throughout the recruitment process. Such solutions should aim to simplify the application process, improve the accuracy of job matching, and streamline the interview scheduling process, all while maintaining a high level of user engagement and satisfaction.

The present disclosure provides a method and system for streamlining the job application and recruitment process. This is achieved by integrating multiple functionalities into a unified platform, thereby enhancing operational efficiency and user experience for both job seekers and employers. The integrated platform incorporates a common application, a matching algorithm, and an interview scheduling system, all designed to facilitate the efficient processing of job applications and the scheduling of first-round interviews.

The common application allows candidates to submit a single application that is considered for multiple job opportunities, reducing redundancy and improving efficiency. The matching algorithm, designed to handle large datasets efficiently, matches candidates to job opportunities based on a combination of fixed and fuzzy matching techniques. This allows for quick filtering of basic criteria and more nuanced comparisons between candidate qualifications and job requirements. The interview scheduling system enables candidates to directly schedule interviews based on real-time employer availability, streamlining the process and reducing typical delays associated with interview coordination.

In some embodiments, the platform may also incorporate employer-specific supplemental questions, allowing for more tailored matching results. The platform may also use vectorization techniques in the matching algorithm to efficiently compare and analyze text-based data such as job descriptions and resumes. This allows for more nuanced comparisons that can capture semantic similarities, even when exact word matches are not present, while still maintaining the performance necessary for real-time matching in a large-scale job application processing system.

The platform's unique approach not only simplifies the recruitment process but also fosters a more dynamic and responsive job market, substantially improving the recruitment landscape for all parties involved. By seamlessly integrating comprehensive application submission, dynamic job matching, and real-time interview scheduling, this process sets a new standard in the industry, enhancing both efficiency and user satisfaction.

Thus, methods and systems of the present disclosure may be improvements to computer technology and/or efficient and accurate matching.

1. Environment

FIG. 1 depicts an environment 100 of an integrated application processing and scheduling platform. The environment 100 includes a platform 105, user devices 110, employer devices 115, and networks 120. The platform 105 is connected to the networks 120, which facilitate communication between the platform 105, user devices 110, and employer devices 115.

The platform 105 may be a server or a cloud-based system that hosts the integrated job application processing and interview scheduling platform. The platform 105 may include various modules and components, such as a user interface, a matching engine, a scheduling module, a data repository, and a communication system, among others. These components work together to provide a comprehensive job application and interview scheduling system.

The user devices 110 represent devices used by users or candidates to interact with the platform 105. In some cases, the user devices 110 may include personal computers, laptops, tablets, smartphones, or any other computing devices capable of accessing the platform 105 via the networks 120. The user devices 110 may include a web browser or a dedicated application for accessing the platform 105.

The employer devices 115 represent devices used by employers or recruiters to interact with the platform 105. Similar to the user devices 110, the employer devices 115 may include various types of computing devices capable of accessing the platform 105 via the networks 120. The employer devices 115 may also include a web browser or a dedicated application for accessing the platform 105.

The networks 120 enable bidirectional data flow between the user devices 110, employer devices 115, and the platform 105. The networks 120 may include one or more networks, such as the internet, local area networks (LANs), wide area networks (WANs), direct connections, or any other suitable networks. The networks 120 allow for the exchange of job application information, interview scheduling data, and other relevant communications within the system.

In some aspects, the platform 105 may be configured to receive job application data from the user devices 110, process the data using the matching engine, and provide matching job opportunities to the candidates. The platform 105 may also be configured to receive job posting data from the employer devices 115 and match the job postings with suitable candidates. The platform 105 may further be configured to facilitate the scheduling of interviews between the candidates and the employers based on their mutual availability.

In some cases, the platform 105 may also provide various other features and functionalities, such as feedback collection, data analytics, and communication services, among others. These features and functionalities may enhance the user experience and improve the efficiency and effectiveness of the job application and interview scheduling process.

The technology of the platform 105 of the present disclosure fundamentally transforms the recruitment landscape by seamlessly integrating job application submission and first-round interview scheduling into a singular, streamlined process. This innovation not only simplifies each stage—from job application to the scheduling of initial interviews— but also significantly enhances operational efficiency and improves the user experience for both candidates and employers.

Unlike traditional recruitment systems that require candidates to submit multiple applications for various jobs across different platforms, the platform 105 allows candidates to complete a single application. This single entry is then automatically considered for all relevant job openings within the database. The platform 105 matches each candidate with the most suitable opportunities based on their profiles. Subsequently, candidates can select their preferred opportunity to immediately schedule a first-round interview, thereby condensing the entire job search and application process into a few simple, efficient steps.

The comprehensive and integrated approach not only minimizes the workload for candidates but also simplifies the recruitment process for employers. Employers benefit from an efficient system to review well-matched candidates, significantly reducing the time and resources typically required to identify and engage potential hires. See, e.g., FIGS. 3-6.

The traditional job application process is fraught with inefficiencies that create significant hurdles for both job seekers and employers. Candidates often face a fragmented application landscape, requiring them to navigate multiple job boards, corporate sites, and recruitment platforms to sift through numerous job opportunities that may or may not match their interests. Each of these platforms demands separate applications per job opportunity and various forms of engagement (e.g., lengthy applications, personality assessments, video-recorded question responses), consuming substantial time and effort. According to the Leigh University Center for Career and Professional Development, it currently takes approximately 100-200+ applications to receive one job offer (Leigh University Center for Career & Professional Development, "How Many Applications Does It Take to Get a Job?", 2021, available at https://www.hire-lehigh.com/post/how-many-applications-does-it-take-to-get-a-job). Additionally, even after applying for many opportunities, the likelihood of actually receiving an interview is extremely low. According to Glassdoor, the average job opening attracts about 250 resumes, with only four to six candidates (~3%) receiving an invitation to a first-round interview (Glassdoor, "50 HR and Recruiting Stats That Make You Think", 2015, available at https://www.glassdoor.com/employers/blog/50-hr-recruiting-stats-make-think/). This competitive and dispersed approach not only increases the workload on candidates but also complicates the recruitment process for employers, who must sift through numerous applications, many of which fail to closely meet the job criteria.

Furthermore, existing recruitment systems typically operate in silos within organizations, with minimal integration across different departments. Candidates typically apply for one specific role and are not automatically considered for other available opportunities within the same organization that might match their skills. This lack of systemic coordination can lead to highly qualified candidates falling through the cracks if they happen to apply for a role that has been recently filled or is no longer active, or if their skills are better suited for another role in a different department or location. Such decentralized recruitment processes create inefficiencies that result in lost talent and missed opportunities both for candidates and employers.

Moreover, the structure of these systems leads to considerable delays from the time a candidate applies to a job to when they can actually engage with potential employers in interviews. The platforms in place struggle to adapt to the dynamic nature of job and candidate availability, often resulting in scheduling conflicts and additional inefficiencies.

In addition to these structural issues, current platforms generally lack real-time responsiveness. The process of scheduling interviews often involves protracted back-and-forth communications that can extend over several days or even weeks. This delay is exacerbated by the absence of a centralized system capable of dynamically updating and managing the availability of both candidates and employers based on real-time data. The platform 105 addresses these critical inefficiencies by integrating the job application and interview scheduling into a single, streamlined method that enhances the recruitment process for all parties involved.

Employers encounter overwhelming volumes of applicants, high recruitment costs, and inefficiencies that hinder their ability to make quality hires swiftly across their portfolios of availability job opportunities. These challenges are compounded by difficulties in achieving a diverse and inclusive workforce, as unconscious biases in traditional recruitment methods persist.

Candidates, on the other hand, compete in an overly saturated job market where only a small fraction secures interviews. About 78% of candidates perceive the application process as a reflection of how a company values its employees, often feeling discouraged by the lack of communication and feedback. Despite having relevant qualifications, many are overlooked due to biases or mismatches in cultural alignment, lack of transparency regarding opportunity availability (fake role posts and/or expired ones) and application processes that continue to become more lengthy prior to the first round interview (for example, additional pre-interview steps such as personality and fit assessment tests), further complicating their job search, which can be lengthy and disheartening without any guarantee of progressing to the interview stage.

Unlike traditional systems that primarily aim to assist employers in narrowing down candidates, the platform 105 places a strong emphasis on improving the candidate experience. The platform 105 simplifies and accelerates the job application process, making it easier for candidates to match relevant opportunities and to secure first-round interviews. By integrating application processing across multiple opportunities simultaneously and interview scheduling into a single, cohesive process, the platform 105 enhances the speed and accuracy of candidate-employer matching while incorporating real-time interview scheduling. The platform 105 significantly streamlines the recruitment timeline, directly addressing the critical inefficiencies currently plaguing the recruitment landscape.

This comprehensive approach not only mitigates administrative overhead for employers but also revolutionizes the candidate experience by making the process of finding relevant opportunities, applying for jobs, and scheduling interviews more straightforward and efficient. The platform 105 may be designed to enhance user engagement and satisfaction, and marks a significant shift towards a more balanced, equitable recruitment process, benefiting the entire job market ecosystem.

The platform 105 may simplify and accelerate the job application process through an integrated process that allows candidates to apply once and receive immediate job matches for first-round interviews. By focusing on optimizing the process for these initial interactions, the time and complexity typically associated with the early stages of job searching and screening is significantly reduced. This is achieved through an innovative combination of a unified application process, a sophisticated matching algorithm, and a real-time scheduling system that together facilitate quick and efficient scheduling of first-round interviews based on real-time availability, effectively minimizing delays and maximizing the chances for candidates to secure timely opportunities.

The platform 105 introduces a unified application portal where candidates submit all necessary information through a one-time comprehensive entry. This data is utilized across multiple job applications to different employers via a simultaneous application process, effectively eliminating redundant data entry. The platform 105 may use the unified application to reduce redundancy and enhance the application experience.

By leveraging detailed candidate data and dynamic employer requirements, the platform 105 executes precise and efficient job matches. This streamlined matching process does not require candidates to search and apply individually for each job, thereby reducing both the complexity and duration of job searches. The candidate's application is compared against all available jobs within the database simultaneously, clarifying role searching and application ambiguities, and providing candidates with the best match results for their profiles. See, e.g., FIG. 2.

Upon successful job matching, candidates can directly review job description details and directly select an opportunity from their matches to schedule an interview. This functionality is enabled by integrating the applicant tracking system (ATS) logic into the matching algorithm, effectively replicating the process typically handled on the employer side for each opportunity. By acting as a global applicant tracking system, the matching algorithm empowers candidates to select and schedule interviews for opportunities they match with directly. Upon selecting a role to interview for, the candidate is then presented with supplemental questions customized by the employer per opportunity ("yes" or "no" response questions) as a pass/fail final step before allowing the candidate to review employer availability for interview scheduling. The platform 105 may incorporate a seamless transition to directly integrated interview scheduling. Candidates can immediately view and select interview times that align with real-time employer availability, simplifying the scheduling process and reducing the typical delays associated with interview coordination. This integration eliminates the need for separate application and interview scheduling steps, significantly streamlining the recruitment process for both candidates and employers. See FIG. 2.

The platform 105 may use an integrated communication system. The integrated communication system may facilitate direct and immediate interaction between candidates and employers, streamlining information exchange, and supporting efficient management of application and interview details.

The platform 105 may include automated mechanisms ensuring all job applications adhere to specific regulatory compliance and privacy standards set by employers. This automation enhances the recruitment process's reliability and security, ensuring appropriate candidate data handling. See FIG. 2.

The technology of the present disclosure revolutionizes the job application and recruitment process by integrating essential functionalities into a cohesive, streamlined method. By focusing on the sequence of interactions and processes candidates experience, the platform 105 not only improves efficiency and reduces administrative overhead but also significantly enhances the overall candidate experience. This platform 105 fosters a quicker, more effective recruitment process, thereby benefiting both candidates and employers across the job market ecosystem.

In some cases, the platform 105 may be designed specifically for facilitating first-round interviews. In these cases, the platform 105 may significantly simplify the initial screening phase. Once candidates are matched with job opportunities, they are given the option to schedule a first-round interview directly. This interview acts as the initial screening phase, allowing both candidates and employers to assess mutual suitability before proceeding to more detailed subsequent rounds. The platform 105 ensures that all logistical and scheduling aspects of these first-round interviews are handled seamlessly, integrating real-time employer availability and candidate preferences to schedule these interviews efficiently and without the need for manual intervention.

For data entry, applicants enter detailed information via a user-friendly form that includes sections for personal details, educational background, work history, skills, certifications, and preferences for future opportunities (such as desired role title, preferred locations, workplace type, and industry). This holistic approach ensures that all relevant information is captured efficiently and stored centrally.

For resume and documents uploads, the platform 105 incorporates advanced document analysis technology to automatically parse and verify information from uploaded resumes and other documents. This feature not only reduces the need for manual data entry but also enhances the accuracy of the information stored in the candidate's profile, which is crucial for the matching accuracy.

For data utilization, once collected and the candidate reviews/submits their profile, the data is immediately then integrated into the matching algorithm which acts as a global applicant tracking system (ATS), where it is used to enhance the candidate's visibility across all potential job opportunities. This ensures that no suitable job opportunity is missed due to data silos or unlinked systems. This integrated approach minimizes redundancy and maximizes efficiency, enabling candidates to apply to multiple positions across various employers with a single submission, thus transforming the candidate application experience.

In contrast to traditional systems where candidates must apply for specific roles individually, the platform 105 automates the matching process. For instance, the matching process may leverage a matching algorithm that acts as essentially a global ATS to enhance candidate exposure to potential opportunities.

Upon submission, the candidate's profile is automatically compared against all available job listings in the database. Matching algorithms evaluate compatibility based on a myriad of factors derived from detailed profile information, including but not limited to qualifications, experiences, and stated preferences, streamlining the job search process significantly.

By eliminating the need for candidates to manually apply for each job, the platform 105 significantly saves time and ensures that candidates are considered for all relevant opportunities. This broad exposure maximizes their chances of finding suitable employment, streamlining the job search process significantly.

Employers have the option to include bespoke supplementary questions specific to each job listing. These questions allow employers to gather additional information that is pertinent to the role but not typically captured in a standard application form. When a candidate's profile matches a job listing that includes supplementary questions, they are prompted to answer these questions, ensuring that only the most relevant candidates are considered for specialized roles. This targeted questioning aligns with employer-specific needs and further refines the matching process.

After a successful match, applicants can view and select from available time slots directly from the employer's calendar. The platform 105 presents the interview type set by the employer (e.g., phone, video call, assessment test link) and the duration, ensuring seamless scheduling integration.

Applicants choose a suitable time slot, which books the interview directly, streamlining the process and ensuring immediate confirmation. The booked time slot is then immediately reflected on the employer's calendar for review.

The platform 105 is designed to automate and integrate all steps from application submission to interview scheduling, crafting a seamless and user-friendly experience that significantly reduces the need for manual intervention. This automation is crucial in minimizing the biases typically introduced by manual handling of applications, as it standardizes the initial screening based on quantifiable data.

The platform 105 may have a sophisticated architecture to ensure that each component, from the candidate's application to the final interview scheduling, operates in harmony. This integration helps streamline processes, reduce errors, and increase efficiency. Changes in job listings, candidate profiles, or interview schedules are updated, ensuring that all stakeholders have access to the most current information.

By automating the initial screening and matching process, the platform 105 serves as an intermediary between candidates and employers, which is crucial for reducing unconscious biases that are often prevalent in manual resume reviews. This automation ensures that candidates are evaluated based on their skills and qualifications rather than subjective criteria, which can often be influenced by personal biases. This methodical approach helps to standardize the screening process, ensuring all candidates are given equal consideration based on merit.

Furthermore, the platform 105 empowers candidates by allowing them to choose which job opportunities they wish to pursue for interviews, based on the matches provided. This level of autonomy places candidates in control of their job search, effectively reducing potential biases related to age, race, gender, or other personal characteristics. By enabling candidates to select the roles they feel most aligned with, the platform 105 not only promotes agency but also helps to ensure that opportunities are accessed based on fit and interest rather than biased filtering. The platform 105 may be designed to emphasize qualifications and fit over subjective impressions, supporting a more equitable and inclusive hiring process.

By providing a system that focuses on qualifications and reducing personal biases, the platform 105 supports employers in building a more diverse and inclusive workforce. The transparency and fairness of the automated process can help enhance the reputation of organizations as equitable employers.

The platform 105 may include an automated feedback mechanism that enables continuous refinement of the platform 105 based on real user experiences, improving functionality and user satisfaction.

The platform 105 ensures all interactions and data management comply with regulatory standards, automatically adjusting to specific requirements set by employers. Additionally, as part of each posted job description, direct links to employer privacy policies are provided directly to candidates.

The platform 105 may enable employers to integrate specific questions as part of the application process. For instance, employers may select "supplemental questions" to tailor individual questions (with expected "yes" or "no" responses) directly to the candidate before interview availability selection, ensuring candidates meet all preliminary requirements before being able to schedule the interview.

Employers commence their interaction by completing a registration process. During registration, they are required to input relevant company information, upload a company logo, and provide a banner image. These visuals are displayed to candidates alongside the employer's job postings within the job matching interface, enhancing the employer's brand visibility to potential applicants.

Following registration, employers can create and post job listings directly to the database. For each job opportunity, employers provide essential details such as the role description, job title, location, and other specific requirements. Critically, employers have the option to include additional qualifications in the job posting process, such as: sponsorship, criminal records, or government officials. Employers may indicate whether the position is open to sponsoring candidates, facilitating matches with international applicants or those requiring visa sponsorship. Employers can specify if the position is open to candidates who have disclosed a past criminal history. This inclusion is critical for matching candidates who have affirmatively answered related questions and provided explanations or mitigating circumstances regarding their past. Employers can choose to include a question regarding whether candidates have any current or prior relationships with government officials. This is particularly relevant for positions requiring security clearance, ethical compliance, or transparency. Candidates who respond affirmatively are prompted to provide details about the nature of these relationships, which are then made available to employers when reviewing applications for roles where such disclosures are pertinent. These detailed options in the job posting process not only enhance the matching accuracy but also ensure compliance and suitability for roles with specific legal or ethical considerations. This tailored approach underscores the versatility and capability of the platform 105 to adapt to diverse employer needs and regulatory environments.

Upon successful registration and job posting, employers are prompted to specify their availability for interviews through the integrated scheduling module of the platform 105. This module is not restricted to individual job postings but rather allows employers to set a generalized availability that applies to all active job listings. This holistic approach ensures that once an employer sets their availability, it is effectively mapped across all their open positions, simplifying the management of interview slots.

The scheduling interface centralizes the availability settings, allowing employers to manage their interview schedules in one place, irrespective of the number of jobs posted. The platform 105 dynamically adjusts to display real-time availability to candidates, streamlining the scheduling process and ensuring it is free from conflicts.

While the availability may be uniform across all postings, employers retain the flexibility to control the number of interview slots allocated per specific job opportunity. This feature is crucial for managing the flow of candidates, especially for roles that may attract a higher volume of applicants or require more in-depth interview processes. Employers can specify limits on the number of interviews per day for each role, helping to balance the distribution of candidates and ensure quality interactions.

The scheduling system is designed to update in real time, reflecting any changes in employer availability or specific job slot allocations immediately. This responsiveness prevents scheduling conflicts and ensures that candidates see only those slots that are genuinely available, enhancing the efficiency and user experience of the scheduling process.

The scheduling module of the platform 105 is not only efficient but also easily accessible, enabling employers to make quick adjustments as needed. Whether it's blocking out times for breaks, extending available hours for a surge in applications, or closing slots for a fully staffed position, the flexibility of the platform 105 supports a wide range of scheduling needs directly through a simple to use calendar interface.

Upon posting job opportunities, employers do not receive traditional applications. Instead, the platform 105 automates the interview scheduling process by adding interviews directly to both the employer's calendar and the candidate's calendar as candidates select job roles for interviews. This streamlined approach ensures that both parties move swiftly from job matching to interview scheduling without the intermediate step of application review.

Once a candidate selects a job for an interview, the platform 105 automatically schedules the interview based on the availability previously set by the employer and the type of interview selected by the candidate. This integration allows for efficient management of interview schedules and ensures that employers are promptly informed about upcoming interviews.

After an interview is scheduled, employers have the ability to download the candidate's resume and detailed profile. This includes comprehensive personal and professional information, responses to any supplementary questions relevant to the job, and details specific to the scheduled interview. This feature enables employers to prepare effectively for the interview by reviewing the candidate's qualifications and other pertinent details beforehand.

Employers determine the type of interview that will be conducted for each job posting, which can include options such as a phone interview, a video call, or an assessment test. This specification is made at the time of job posting and is communicated to candidates as part of the job details, ensuring that all parties are aware of the interview format in advance.

After conducting interviews, employers are encouraged to provide feedback regarding their experiences with both the candidates and the platform 105. This feedback is crucial as it contributes to the continuous refinement of the matching algorithms, enhancing the overall functionality and effectiveness of the system. Additionally, analytics derived from employer feedback help in making data-driven improvements.

Candidates benefit from a simplified application process where they submit a single, comprehensive profile. This profile is automatically matched against all available job opportunities, significantly reducing the time and effort typically required to search for and apply for multiple jobs individually.

The matching algorithm (global ATS) approach leverages sophisticated algorithms to ensure that candidates are matched with job opportunities that best align with their skills, experiences, and preferences. This not only increases the likelihood of finding suitable positions but also accelerates the process of securing first-round interviews.

Candidates have more control over their job search as they are provided with tailored job matches based on their profile. They can review these opportunities and decide which positions they want to pursue for interviews, thereby making the job search more directed and personal.

Employers experience shorter hiring cycles due to the process's ability to automate and integrate the recruitment process from job posting to the scheduling of interviews. This integration ensures that suitable candidates are quickly identified and interviews are scheduled without delay, speeding up the time to hire.

The process's comprehensive matching system considers a wide range of factors, including qualifications, past work experience, and job-specific preferences. This thorough approach improves the quality of matches, ensuring that employers receive candidates who are more likely to fit the role and excel in their positions.

Employers gain valuable insights from the analytics features of the platform 105, which track and analyze candidate interactions and preferences. These insights can inform future job postings and recruitment strategies, making the hiring process more data-driven and targeted.

By automating the initial screening and matching processes, unconscious biases that often occur in traditional recruitment are minimized. This promotes a more diverse and inclusive workforce by ensuring candidates are evaluated based on their merits rather than subjective impressions.

The platform 105 is designed for high adaptability, supporting extensive customization and seamless integration across various operational environments.

The platform 105 may be accessible via a standard web interface, compatible with all major browsers and mobile devices. This universal accessibility ensures that candidates and employers can interact with the system effortlessly.

The interface is designed to be intuitive and user-friendly, supporting secure user authentication processes for both candidates and employers. This ensures a safe and accessible environment for all users.

The platform 105 may establish a robust centralized database to store and manage comprehensive datasets including user profiles, job listings, and interaction logs. This database is optimized for high-performance data operations, supporting efficient real-time data retrieval and updates necessary for maintaining system integrity and responsiveness.

Candidates and employers input their information through detailed input forms, which capture essential personal, educational, and professional information. Once entered, this data can be utilized across multiple job applications, reducing redundancy and improving efficiency.

Employers utilize a streamlined interface for posting job openings, which allows for detailed customization of job requirements and desired candidate qualifications. This flexibility ensures that all job postings comply with employment standards and regulations.

The platform 105 utilizes sophisticated algorithms to globally match candidates with job opportunities based on multiple criteria. These algorithms are designed to learn from user interactions, continually refining the matching process to increase accuracy and relevance.

The platform 105 may deploy a scheduling module that harmonizes employer availability with candidate preferences. This module facilitates automatic interview scheduling, significantly enhancing the user experience by eliminating manual scheduling efforts.

The platform 105 may employ robust security protocols. The security protocols may implement industry-specific security measures, including data encryption and secure data transmission protocols, to safeguard user information against unauthorized access and breaches. The platform 105 may ensure automated compliance with relevant employment laws and data privacy regulations, fostering a legally secure environment for all users.

The platform 105 may conduct extensive testing to verify that all features operate as intended and meet user needs. This includes automated system testing and active feedback cycles with users to continuously refine functionality.

platform 105 may regularly monitor system performance using key metrics such as user engagement, match accuracy, and operational response times. These insights are useful for assessing system effectiveness and guiding future improvements.

The platform 105 revolutionizes the recruitment process by integrating job application processing and first-round interview scheduling into a single cohesive workflow, dramatically enhancing both operational efficiency and user experience. This advanced approach not only simplifies the recruitment process but also fosters a more dynamic and responsive job market, substantially improving the recruitment landscape for all parties involved. The platform 105 is constructed with a modular framework that facilitates substantial future integrations, thus enhancing both its versatility and depth.

The platform 105 may use machine learning and/or artificial intelligence ("ML/AI") for predictive analytics, which would significantly refine the matching process based on evolving data insights and enable enhancements over time. The ML/AI may increase the precision of job-candidate matching by analyzing patterns and trends in employment data, thereby improving overall placement outcomes. This integration could also extend to optimizing scheduling efficiencies and enhancing data analysis, crucial for advancing job placement accuracies.

Additionally, the platform 105 may directly interface with existing HR management systems to facilitate seamless data exchanges. This integration streamlines various HR processes by automatically syncing job listings and candidate profiles to external HR systems, thereby reducing administrative overhead and enhancing data integrity.

The platform 105 efficiently manages employer availability and interview scheduling internally. For instance, the platform 105 may integrate with third-party scheduling services. Third party scheduling services may streamline the process further by directly linking the scheduling module of the platform 105 with external scheduling systems widely used by recruiters. The objective is to enable direct access to the availability data from third-party services, where employers often manage their public appointment slots. By integrating with these third-party services, the platform 105 will be able to automatically reflect an employer's publicly available times directly within the job scheduling interface. This approach will alleviate privacy concerns as it does not require access to private details of the employer's primary calendars but utilizes the availability already designated for professional interactions.

This enhancement will allow for a seamless transfer of availability information into the platform 105, reducing the need for employers to manually input or update their schedules on multiple systems. It will ensure that the scheduling module is always up-to-date with real-time changes made on external scheduling platforms, thereby minimizing scheduling conflicts and improving the overall efficiency of the interview process.

Recognizing the sensitivity of calendar data, the integration will focus on using APIs that provide necessary scheduling details without compromising the privacy of the employers' internal calendar information. This method respects the privacy settings inherent in third-party scheduling tools, which are designed to share only the necessary data required for booking appointments.

The platform 105 may incorporate assessment tools designed to evaluate a range of soft skills and technical abilities. The assessment tools could include industry-specific testing modules (such as finance, engineering, or programming) aligned with the skill selections of candidates, providing a more nuanced understanding of applicant capabilities. These tools offer standardized assessments of technical skills or cognitive abilities relevant to specific industries or job roles.

The platform 105 may include personality assessments to evaluate cultural fit and interpersonal skills, which may be used to ensure that candidates align with corporate values and team dynamics. These assessments enhance the qualitative analysis of candidate profiles, aiding employers in making more informed hiring decisions. Additionally, this also saves candidates time as they would only have to consider these additional assessments on the platform 105 rather than on a per opportunity or employer basis saving them time while increasing candidate process efficiency.

The platform 105 may include AI-driven automated initial screening interviews. These interviews could be conducted via integrated video calling features, where AI bots interact with candidates to assess their communication skills, technical knowledge, and suitability for the role. This feature aims to save employers significant time in the screening process, allowing them to focus on the most promising candidates. Additionally, this also saves candidates time as they would only have to perform AI-driven automated interviews once rather than on a per opportunity and/or per employer basis saving them time while increasing candidate process efficiency.

Utilizing AI, the platform 105 may include predictive analytics capabilities, forecasting hiring trends, candidate success rates, and even predicting job market shifts. This feature would provide strategic insights to both employers and candidates, enabling them to make more informed decisions aligned with future market expectations.

The platform 105 may also adapt to and incorporate emerging HR technologies, ensuring it remains at the forefront of recruitment innovation. By maintaining a focus on modularity and general applicability, the platform 105 avoids dependence on specific technical implementations, thereby ensuring its relevance and utility in a rapidly evolving technological landscape.

In some cases, a unified application submission may mean a process wherein candidates input all required data once into the platform 105, which is then utilized to apply to multiple job opportunities across various employers. This reduces redundancy and enhances the efficiency of the application process.

In some cases, a comprehensive matching process may mean a method by which the platform 105 automatically compares candidates' profiles against a database of job opportunities using defined criteria such as qualifications, experience, and job preferences. This ensures that candidates are considered for all relevant positions, thereby maximizing their employment opportunities.

In some cases, real-time interview scheduling may mean a feature that allows candidates to directly select interview times from available slots on an employer's calendar, which is updated in real time. This capability ensures seamless scheduling without manual intervention.

In some cases, a dynamic data repository may mean a centralized storage that manages and synchronizes candidate profiles, job listings, and interaction histories, ensuring data consistency and availability for real-time decision-making.

In some cases, an adaptive learning algorithm may mean algorithm that dynamically adjusts its parameters based on user feedback and interaction data to enhance the matching accuracy and personalization of job matches over time.

In some cases, a modular system architecture may mean a flexible design principle that facilitates easy customization and scalability of the platform 105 by incorporating various functional modules, supporting future expansions and integrations with minimal disruption.

In some cases, security protocols may mean measures implemented to protect data integrity and confidentiality within the platform 105, including encryption, secure data transmission, and user authentication processes.

In some cases, an employer dashboard may mean an interface that enables employers to manage job postings, view candidate matches, schedule interviews, and collect feedback, all from the platform 105.

In some cases, a candidate dashboard may mean an interface that enables candidates to view scheduled interviews, review their profile information, re-run the matching algorithm at regular intervals to receive new job matches and interviews, and collect feedback, all from the platform 105.

In some cases, first-round interviews may mean an initial phase of the interview process, designed to screen candidates based on their qualifications and fit for the role. These interviews are typically less comprehensive than later stages and serve as a preliminary assessment to narrow down the pool of applicants.

In some cases, an applicant tracking system (ATS) may mean a software application that facilitates the electronic handling of recruitment needs by automating the organization, filtering, and analysis of candidate applications. In the platform 105, the ATS is enhanced to not only manage candidate data but also integrate with advanced matching algorithms and real-time scheduling features, streamlining the recruitment process significantly.

The platform 105 transforms the job application and recruitment landscape by integrating multiple functionalities into a unified and efficient process. The platform 105 not only streamlines the process for applicants and employers with regards to attaining first-round interviews, but also introduces a level of automation and intelligence that significantly enhances the recruitment experience. By seamlessly integrating comprehensive application submission, dynamic job matching, and real-time interview scheduling, the platform 105 sets a new standard in the industry, enhancing both efficiency and user satisfaction.

2. Platform

Figure 2:
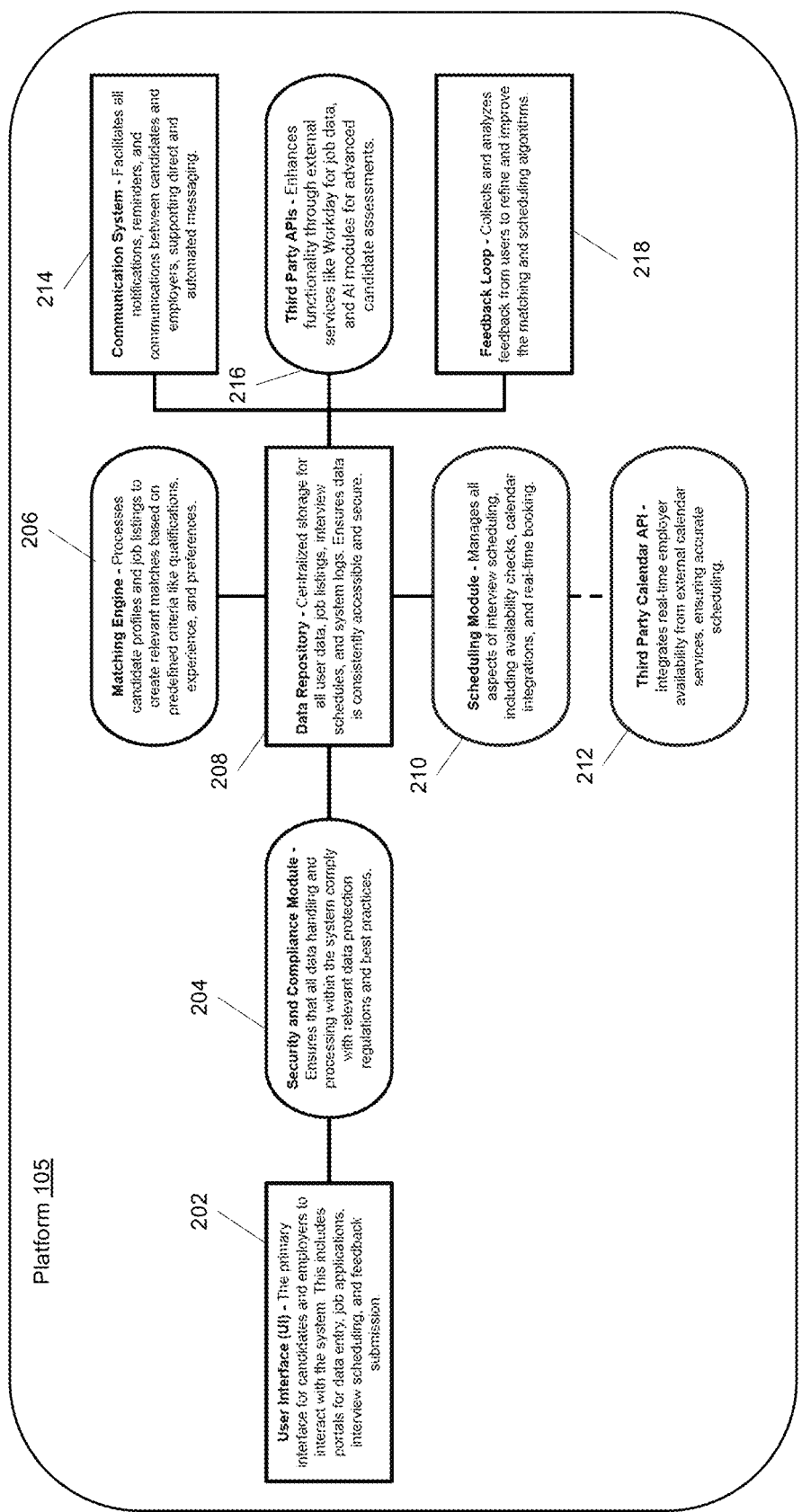
FIG. 2 illustrates a system diagram of a platform for integrated application processing and interview scheduling, according to aspects of the present disclosure.

FIG. 2 depicts a system diagram 200 of the platform 105 for integrated application processing and scheduling. The platform 105 comprises several interconnected components that work together to facilitate the recruitment process.

The user interface 202 serves as the primary interface for candidates and employers to interact with the system. It includes portals for data entry, job applications, interview scheduling, and feedback submission. The user interface 202 may be a web-based interface accessible via a web browser or a dedicated application on a computing device. In some cases, the user interface 202 may provide interactive feedback to candidates about their scheduled first-round interviews, including automated confirmation notifications for scheduled first-round interviews, adaptive reminders based on scheduled first-round interview dates and times, and real-time updates on changes to the scheduled first-round interviews.

The security module 204 ensures that all data handling and processing within the system comply with relevant data protection regulations and best practices. The security module 204 may implement various security measures, such as data encryption, secure data transmission protocols, and user authentication processes, to protect user data against unauthorized access and breaches. In some aspects, the security module 204 may also regularly update privacy compliance measures to adhere to global data protection regulations.

The matching engine 206 processes candidate profiles and job listings to create relevant matches based on predefined criteria such as qualifications, experience, and preferences. The matching engine 206 may use both fixed values and fuzzy matching techniques to create accurate matches. In some cases, the matching engine 206 may also incorporate vectorization techniques for analyzing text-based data such as job descriptions and resumes.

The data repository 208 provides centralized storage for all user data, job listings, interview schedules, and system logs. The data repository 208 ensures data is consistently accessible and secure. In some aspects, the data repository 208 may be a database or a cloud-based storage system that can handle large datasets efficiently.

The scheduling module 210 manages all aspects of interview scheduling, including availability checks, calendar integrations, and real-time booking. The scheduling module 210 may integrate with the calendar API 212 to fetch real-time availability from third-party services used by employers to manage professional appointments. This integration allows for efficient management of interview schedules and ensures that employers are promptly informed about upcoming interviews.

The communication system 214 facilitates all notifications, reminders, and communications between candidates and employers, supporting direct and automated messaging. The communication system 214 may include various communication channels, such as email, instant messaging, or push notifications, to provide timely and relevant updates to users.

The third party APIs 216 enhance functionality through external services like Workday for job data and AI modules for advanced candidate assessments. The third party APIs 216 may allow the platform 105 to access and utilize external services and data, enhancing the platform's functionality and providing additional features and capabilities.

The feedback loop 218 collects and analyzes feedback from users to refine and improve the matching and scheduling algorithms. The feedback loop 218 may use various data analysis techniques to identify trends and patterns in user feedback, which can be used to enhance the system's performance and user satisfaction.

All these components are interconnected within the platform 105, working together to provide a comprehensive job application and interview scheduling system. The platform 105 may be configured to receive job application data from the user devices 110, process the data using the matching engine 206, and provide matching job opportunities to the candidates. The platform 105 may also be configured to receive job posting data from the employer devices 115 and match the job postings with suitable candidates. The platform 105 may further be configured to facilitate the scheduling of interviews between the candidates and the employers based on their mutual availability.

3. Platform Flowcharts

Figure 3:
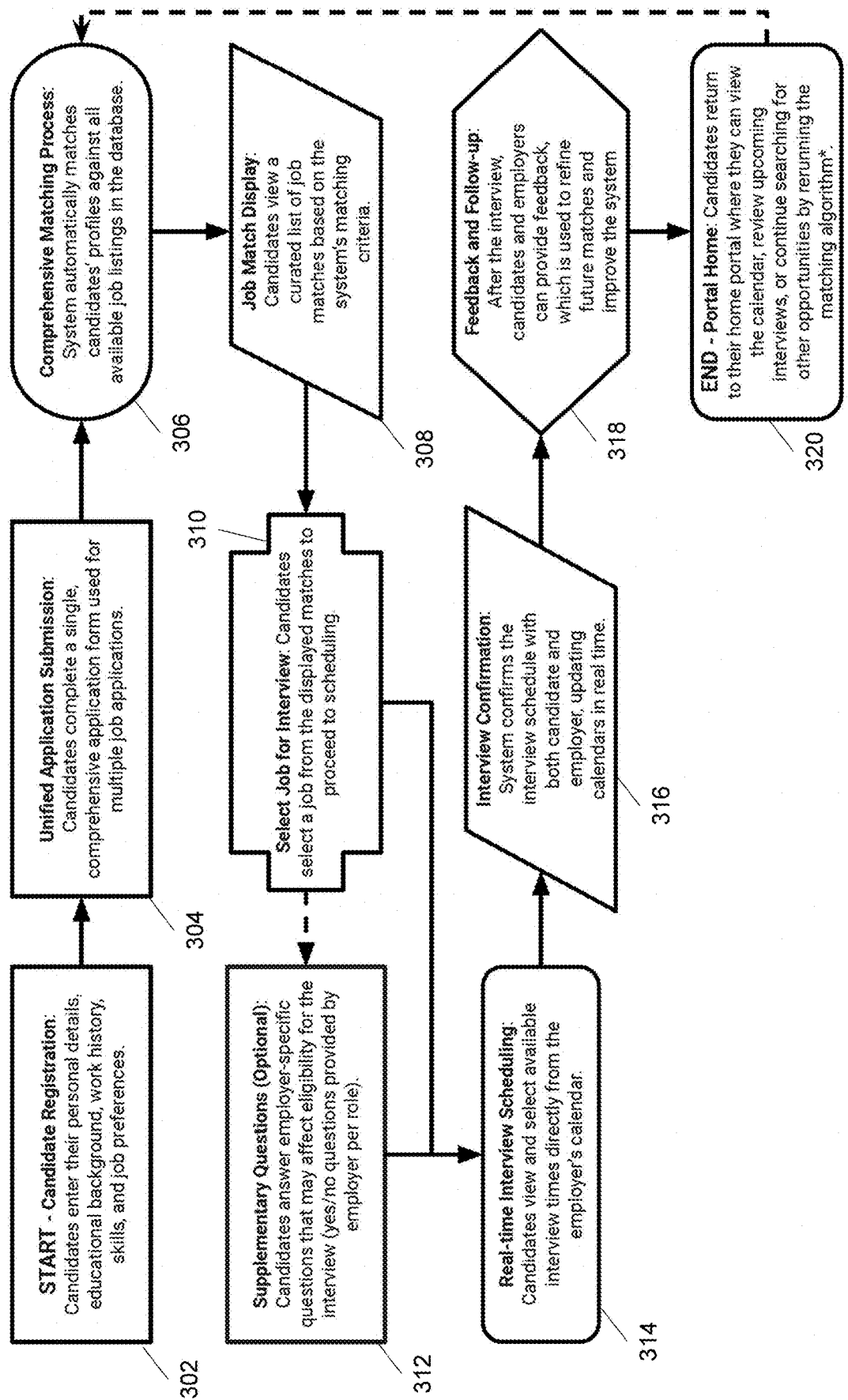
FIG. 3 illustrates a flowchart of a method for an integrated application and scheduling process, according to aspects of the present disclosure.

FIG. 3 depicts a flowchart of a method 300 for an integrated job application and interview scheduling process. The method 300 begins with step 302, where candidates register by entering their personal details, educational background, work history, skills, and job preferences. This registration process may be facilitated through the user interface 202 of the platform 105, as shown in FIG. 2. The registration process may include various data entry fields for collecting comprehensive information about the candidate, such as name, contact information, educational qualifications, work experience, skills, and job preferences. In some cases, the registration process may also include uploading a resume or other supporting documents.

Following registration, the method 300 proceeds to step 304, where candidates complete a unified application submission. This involves filling out a single, comprehensive application form that is used for multiple job applications. The unified application submission may be facilitated through the user interface 202 of the platform 105. The unified application form may include various sections for collecting detailed information about the candidate's qualifications, skills, work experience, and job preferences. The information provided in the unified application form is stored in the data repository 208 of the platform 105 and is used for matching the candidate with suitable job opportunities.

The method 300 then proceeds to step 306, where a comprehensive matching process is performed. The matching process is facilitated by the matching engine 206 of the platform 105, which matches the candidate's profile against all available job listings in the database. The matching process may involve comparing the candidate's qualifications, skills, work experience, and job preferences against the requirements and preferences specified in the job listings. The matching process may use both fixed and fuzzy matching techniques, as described herein.

In step 308, the method 300 presents the candidate with a list of job matches. The job matches are displayed to the candidate through the user interface 202 of the platform 105. The job matches may be ranked or prioritized based on the degree of match between the candidate's profile and the job listings. The candidate can review the job matches and select one or more job opportunities for further consideration.

In step 310, the method 300 allows the candidate to select a job opportunity for scheduling an interview. The interview scheduling process is facilitated by the scheduling module 210 of the platform 105. The scheduling module 210 integrates with the employer's calendar through the calendar API 212 to display the employer's real-time availability for interviews. The candidate can select a suitable time slot for the interview from the available time slots.

In step 312, the method 300 may present the candidate with supplementary questions provided by the employer. The supplementary questions may be specific to the selected job opportunity and may require the candidate to provide additional information or confirm certain eligibility criteria. The candidate's responses to the supplementary questions are stored in the data repository 208 of the platform 105 and may be used for further refining the matching process or for evaluating the candidate's suitability for the job opportunity.

Following the interview scheduling process, the method 300 proceeds to step 314, where the interview schedule is confirmed. The interview schedule is updated in real-time in the employer's calendar and the candidate's calendar. The interview schedule may also be communicated to the candidate and the employer through the communication system 214 of the platform 105.

In step 316, the method 300 may provide an interview confirmation. The interview confirmation may check relevant individuals have confirmed acceptance of the interview slot and/or update schedules using APIS. In some cases, the platform 105 may provide pre-interview preparation resources to the candidate. These resources may include information about the company, the specific role, and general interview tips. The platform 105 may utilize the data repository 208 to access relevant information about the employer and the job position, and present it to the candidate through the user interface 202. In some cases, the platform 105 may also provide interactive preparation tools, such as practice interview questions or virtual interview simulations. The communication system 214 may send reminders to the candidate about the upcoming interview and prompt them to review the preparation materials. This step may help candidates feel more prepared and confident for their interviews, improving the overall quality of the interview process for both candidates and employers.

After the interview, the method 300 allows for feedback and follow-up in step 318. The candidate and the employer can provide feedback about the interview and the overall job application and interview scheduling process. The feedback is collected through the user interface 202 of the platform 105 and is stored in the data repository 208. The feedback may be used for improving the platform 105 and the method 300.

Finally, in step 320, the method 300 routes the candidate back to their home portal, where they can review their upcoming interviews, update their profile, or continue searching for other job opportunities by rerunning the matching algorithm. The home portal may be a personalized dashboard provided to the candidate through the user interface 202 of the platform 105. The home portal may display various information and options to the candidate, such as their profile information, job matches, scheduled interviews, feedback options, and options for rerunning the matching algorithm.

In some aspects, the method 300 may include additional steps or variations. For example, the method 300 may include additional steps for handling rescheduling or cancellation of interviews, handling job offers and acceptances, or providing additional services or features to the candidates or the employers. The method 300 may also include variations in the matching process, the interview scheduling process, or other processes based on the specific requirements or preferences of the candidates or the employers.

FIG. 4 depicts a flowchart of a method 400 for user profile creation and submission in a job application system. The method 400 begins with step 402, which initiates profile registration by prompting the user to enter an email and password. This registration process may be facilitated through the user interface 202 of the platform 105, as shown in FIG. 2. The registration process may include various data entry fields for collecting comprehensive information about the candidate, such as name, contact information, educational qualifications, work experience, skills, and job preferences. In some cases, the registration process may also include uploading a resume or other supporting documents.

Following registration, the method 400 proceeds to step 404, where profile creation occurs. This step involves the creation of a comprehensive profile that includes the information about the candidate. The profile may include personal details, educational background, work history, skills, and job preferences. The profile creation process may be facilitated through the user interface 202 of the platform 105.

After profile creation, the method 400 provides two options for entering profile information. Step 406 represents the option for manual profile entry, where the candidate manually enters all the required information into the system. This may include personal details, educational qualifications, work experience, skills, and job preferences.

On the other hand, step 408 offers an AI-assisted resume upload and autofill option for profile creation. In this option, the candidate uploads their resume, and the system automatically extracts relevant information from the resume to fill in the profile fields. This AI-assisted option may use advanced text analysis techniques to accurately parse and extract information from the resume. This option can significantly reduce the time and effort required for profile creation, especially for candidates with extensive work histories or complex resumes.

Step 410 details the profile entry process, which includes inputting personal details such as name, address, languages spoken, and contact information; educational background and certifications; career history and skills; and future role desires including job type, industry, and location preferences.

The method 400 then proceeds to step 412, which involves legal compliance disclosures. This step ensures that the candidate understands and agrees to the terms and conditions of the platform, as well as any legal requirements or obligations related to the job application process.

In step 414, the method 400 may include a process for obtaining user consent and ensuring compliance with data privacy regulations. This step may involve presenting the user with a comprehensive privacy policy and terms of service agreement. The user interface 202 may display these documents in a clear and accessible manner, allowing users to review the information before providing their consent. In some cases, the platform 105 may implement a multi-step consent process, where users are required to explicitly agree to different aspects of data collection and processing. The security module 204 may work in conjunction with this step to ensure that all data handling practices align with relevant privacy laws and regulations, such as GDPR or CCPA. Additionally, the platform 105 may provide users with options to manage their data privacy preferences, including the ability to opt-out of certain data processing activities or request the deletion of their personal information.

Finally, step 416 allows the user to review and submit their profile. The user can review all the information they have entered, make any necessary corrections or updates, and then submit their profile to the platform. Once the profile is submitted, it is stored in the data repository 208 of the platform 105 and is used for matching the candidate with suitable job opportunities.

The method 400 concludes with a point A, which connects to further processing steps depicted in FIG. 5 for job matching or interview scheduling.

In some aspects, the method 400 may include additional steps or variations. For example, the method 400 may include additional steps for verifying the accuracy of the information provided by the candidate, or for collecting additional information that may be relevant for certain job opportunities. The method 400 may also include variations in the profile creation process based on the specific requirements or preferences of the candidates or the employers.

FIG. 5 depicts a flowchart of a method 500 for job application processing and interview scheduling, for instance from point A of FIG. 4. The method 500 begins with step 502, which involves profile creation confirmation. This step may involve the platform 105 confirming the successful creation of a candidate's profile. The profile creation confirmation may be communicated to the candidate through the user interface 202 of the platform 105. The profile creation confirmation may include a notification or a message indicating that the candidate's profile has been successfully created and is ready for use in the job application process.

Following profile creation confirmation, the method 500 proceeds to step 504 for (optional) supplemental examination(s) or AI interview(s) after profile creation confirmation. In some cases, the platform 105 may provide additional tools or features for assessing the candidate's qualifications or skills. These tools or features may include online examinations, quizzes, or assessments that the candidate can complete to provide additional information about their qualifications or skills. The results of these supplemental examinations or AI interviews may be stored in the data repository 208 of the platform 105 and may be used for further refining the matching process or for evaluating the candidate's suitability for the job opportunity.

The method 500 then proceeds to step 506, where a matching algorithm is run. The matching algorithm may be executed by the matching engine 206 of the platform 105. The matching algorithm may use the candidate's profile information and the results of any supplemental examinations or AI interviews to match the candidate with suitable job opportunities. The matching algorithm may use both fixed and fuzzy matching techniques, as previously described, to create accurate matches.

In step 508, the matches are reviewed. The candidate may review the job matches through the user interface 202 of the platform 105. The job matches may be presented to the candidate in a list or a grid format, with each job match represented by a job listing or a job card. The job matches may be ranked or prioritized based on the degree of match between the candidate's profile and the job listings.

In step 510, the candidate selection is determined. For instance, the platform 105 may wait for a user to select a presented job/role or that the user exists the current search results.

In step 512, the method 500 may determine no role was selected and route to step 528, discussed below. The user selection of no roles/jobs may be used as feedback on accuracy to further refine the matching process or for evaluating the candidate's suitability for the job opportunity.

In step 514, the method 500 may determine at least one role was selected and route to either step 514 or step 524, discussed below.

In step 516, the platform may present employer-provided supplemental questions to the candidate. These questions may be specific to the selected job opportunity and may require additional information or confirmation of certain eligibility criteria. The user interface 202 may display these questions in a clear and organized manner, allowing the candidate to provide responses efficiently. The questions may include multiple-choice options, yes/no queries, or short answer fields. As the candidate answers each question, the platform may validate the responses in real-time, providing immediate feedback if any answers do not meet the employer's criteria. The responses to these supplemental questions may be stored in the data repository 208 and may be used to further refine the candidate's suitability for the position.

In step 524, where no employer-provided questions are presented, the platform may proceed directly to the interview scheduling process. In this case, the system may determine that the employer has not specified any additional screening questions for the selected job opportunity. The user interface 202 may display a message informing the candidate that no additional questions are required and that they can proceed to schedule an interview. As discussed in step 524, the platform may then present the candidate with available interview time slots based on the employer's real-time availability, which may be retrieved from the scheduling module 210 and calendar API 212. This streamlined process may allow candidates to move more quickly through the application process for positions that do not require additional screening questions.

In step 518, the method 500 may determine if the candidate has failed to meet the criteria set by the employer-provided questions from step 516. If the candidate's responses do not satisfy the employer's requirements, the process may route the candidate back to step 510 for role selection. This routing may allow candidates who do not meet specific criteria for one position to explore other opportunities within the system. The user interface 202 may display a message informing the candidate that they did not meet the requirements for the selected position and encourage them to consider other roles that may better match their qualifications. The platform 105 may use this information to refine future job matches for the candidate, prioritizing positions with requirements more closely aligned with the candidate's profile and responses.

In step 520, if the candidate successfully passes all employer-provided questions, or if no questions were required as determined in step 524, the method 500 may proceed to the interview scheduling process in step 522. The platform 105 may present the candidate with a scheduling interface through the user interface 202. This interface may display available interview time slots based on real-time data retrieved from the employer's calendar via the scheduling module 210 and calendar API 212. The candidate may select a preferred time slot that aligns with their availability. In some cases, the platform may offer multiple interview format options, such as in-person, phone, or video interviews, depending on the employer's preferences. The scheduling interface may also provide additional information about the interview, such as expected duration, interviewer names, or any specific instructions from the employer. Once the candidate selects a time slot, the platform may automatically update the employer's calendar and send confirmation notifications to both parties through the communication system 214.

In step 526, the interview is confirmed through the platform's communication system. The system may send automated confirmation notifications to both the candidate and the employer, detailing the scheduled interview time, date, format, and any additional relevant information. The user interface may display a confirmation message to the candidate, providing a summary of the interview details. In some cases, the platform may also generate and send calendar invitations to both parties, which can be directly added to their respective digital calendars. The system may also provide options for the candidate to add reminders or set up notifications for the upcoming interview.

In step 528, the user is routed to their home portal within the platform. This personalized dashboard may display a variety of information and options related to the candidate's job search and application process. The user interface may prominently feature a section showing upcoming scheduled interviews, including the one just confirmed. Additionally, the home portal may provide options for the candidate to review their profile, update their information, or rerun the matching algorithm to discover new job opportunities. The system may also offer features such as interview preparation resources, company research tools, or the ability to communicate with potential employers through the platform. By routing users to this centralized home portal, the platform ensures that candidates have easy access to all relevant information and tools to manage their job search effectively. Based upon platform triggers (e.g., time, new roles, user request), the method may return to step 506 to re-run the matching algorithm.

In some aspects, the method 500 may include additional steps or variations. For example, the method 500 may include additional steps for handling rescheduling or cancellation of interviews, handling job offers and acceptances, or providing additional services or features to the candidates or the employers. The method 500 may also include variations in the profile creation process, the matching process, the interview scheduling process, or other processes based on the specific requirements or preferences of the candidates or the employers.

FIG. 6 depicts a flowchart of a method 600 for efficient and accurate matching of user data and postings. The method 600 begins with step 602, where user data is obtained for a user. The user data may include a variety of information about the user, such as personal details, educational background, work history, skills, and job preferences. The user data may be obtained through the user interface 202 of the platform 105, as shown in FIG. 2. The user data may be entered by the user during the registration process or may be collected from other sources, such as uploaded resumes or other documents.

Following the obtaining of user data, the method 600 proceeds to step 604, where user parameters and user text segments are extracted from the user data. The user parameters may include various attributes or characteristics of the user, such as their qualifications, skills, work experience, and job preferences. The user text segments may include portions of text from the user's resume or other documents, such as job descriptions, skill descriptions, or other relevant text.

In step 606, the method 600 involves converting the user text segments into user vectors. This conversion process may involve vectorization techniques, as previously described. The user vectors represent the user text segments in a high-dimensional feature space, allowing for efficient comparison and analysis of text-based data. The user vectors may be stored in the data repository 208 of the platform 105, as shown in FIG. 2.

The method 600 then proceeds to step 608, where the user parameters and user vectors are stored in a database associated with a user ID. The database may be part of the data repository 208 of the platform 105. The user ID may be a unique identifier assigned to each user, allowing for efficient retrieval and management of user data.

Following the storage of user data, the method 600 moves to step 610, where posting data is obtained. The posting data may include information about job postings, such as job descriptions, job requirements, employer details, and other relevant information. The posting data may be obtained from the employer devices 115, as shown in FIG. 1, or may be collected from other sources.

In step 612, the method 600 extracts posting parameters and posting text segments from the posting data. The posting parameters may include various attributes or characteristics of the job postings, such as job requirements, job location, salary range, and other relevant parameters. The posting text segments may include portions of text from the job descriptions or other relevant text.

In step 614, the method 600 involves converting the posting text segments into posting vectors. Similar to the conversion of user text segments, this process may involve vectorization techniques. The posting vectors represent the posting text segments in a high-dimensional feature space, allowing for efficient comparison and analysis of text-based data. The posting vectors may be stored in the data repository 208 of the platform 105.

In step 616, the method 600 involves storing the posting parameters and posting vectors in a database associated with a posting ID. The database may be part of the data repository 208 of the platform 105. The posting ID may be a unique identifier assigned to each job posting, allowing for efficient retrieval and management of posting data.

After storing the posting data, the method 600 moves to step 618, where a match trigger is evaluated. The match trigger may be a signal or event that initiates the matching process. The match trigger may be based on various factors, such as the completion of a user's profile, the submission of a job application, the availability of new job postings, or other relevant factors.

If there is no match trigger (No branch of step 618), the process loops back to step 618 to wait for a match trigger. If there is a match trigger (Yes branch of step 618), the method 600 proceeds to step 620 to obtain a first set of postings (e.g., all current postings).

In step 622, the method 600 involves filtering to a second set of postings using user parameters, posting parameters, and parameter functions. The parameter functions may be mathematical functions or algorithms that compare the user parameters and posting parameters to determine the relevance or suitability of the postings for the user. The second set of postings may include postings that meet certain criteria based on the user parameters and posting parameters.

In step 622, the method 600 may involve a multi-stage filtering process that utilizes user parameters, posting parameters, and parameter functions to refine the initial set of job postings to a more relevant subset. This filtering process may enhance the efficiency and accuracy of the job matching system by focusing on quantifiable aspects of both the user profile and job postings.

User parameters may include quantified aspects related to the user's profile, such as years of experience in a specific field, current location, desired salary range, education level, certifications held, language proficiency levels, and willingness to relocate. These parameters may be extracted from the user's profile data and represented in a standardized format for easy comparison.

Posting parameters may encompass quantified aspects related to the job posting, such as required years of experience, office location, minimum education requirements, necessary certifications, required language skills, and offered salary range. These parameters may be derived from the structured data provided by employers when creating job listings.

The parameter functions may apply logical expressions to compare the user parameters and posting parameters. These functions may be automatically selected and applied based on the types of data available for each parameter. For example:
1. Location matching: The system may use a distance calculation function to compare the user's location or preferred work locations with the job's location, filtering out positions that exceed a certain distance threshold.
2. Experience matching: A comparison function may evaluate if the user's years of experience meet or exceed the minimum required by the job posting.
3. Salary range matching: The system may apply a range overlap function to determine if the user's desired salary range intersects with the job's offered salary range.
4. Education level matching: A hierarchical comparison function may check if the user's education level meets or exceeds the job's requirements.
5. Skills and certifications matching: The system may use a set intersection function to compare the user's skills and certifications with those required by the job posting, applying a minimum match threshold.
6. Language proficiency matching: A comparison function may evaluate if the user's language proficiency levels meet the job's language requirements.
7. Candidate role preference matching: The system may compare the user's preferred role types or job titles with those of the job posting to determine alignment.
8. Semantic matching: Vector field matching techniques may be employed to compare the semantic similarity between the user's profile and job description, capturing nuanced relationships beyond exact keyword matches.
9. Role discovery bonus: The system may implement a "role discovery bonus" criteria, which may provide additional matching points for candidates who meet some criteria for more junior level iterations of a role. This feature may assist candidates looking to change career fields by matching them with entry-level positions in new industries where they have some transferable skills.

The parameter functions may also incorporate weightings or priorities assigned to different parameters, allowing the system to emphasize certain criteria over others based on their importance to the job matching process. Additionally, the system may apply threshold values to certain parameters, automatically filtering out postings that fail to meet critical requirements.

By applying these parameter functions, the method 600 may significantly reduce the initial set of job postings to a more manageable and relevant subset. This filtered set of postings may then be further refined in subsequent steps of the matching process, using more complex analysis techniques such as vector-based comparisons.

If there are zero postings in the second set (No branch of step 622), the process returns to step 618 to wait for a match trigger. If there is at least one posting in the second set (Yes branch of step 622), the method 600 moves to step 624, which filters to a third set of postings using user vectors, posting vectors, and vector functions.

The vector functions may be mathematical functions or algorithms that compare the user vectors and posting vectors to determine the relevance or similarity of the postings to the user. The third set of postings may include postings that meet certain criteria based on the user vectors and posting vectors.

The method 600 may involve various techniques for breaking down text into smaller parts and vectorizing both the parts and the whole. In some aspects, text may be segmented into sentences, paragraphs, or individual words. Natural language processing techniques may be employed to extract keywords or key phrases from the text.

For sentence-level segmentation, the system may use punctuation and capitalization rules to identify sentence boundaries. Paragraph breaks may be detected through line breaks or indentation. Word tokenization may involve splitting text on whitespace and removing punctuation.

In some cases, more advanced natural language processing techniques may be used to identify named entities, extract noun phrases, or determine the syntactic structure of sentences. These techniques may provide additional context and meaning to the extracted text segments.

The system may employ various algorithms to vectorize the text segments and the full text. One approach may involve using term frequency-inverse document frequency (TF-IDF) vectorization. This method may assign numerical scores to words based on their frequency in a document and their rarity across all documents in the corpus.

Another vectorization technique that may be used is Word2Vec, which creates dense vector representations of words based on their context in large text corpora. This approach may capture semantic relationships between words, allowing for more nuanced comparisons.

For longer text segments or entire documents, the system may use Doc2Vec, an extension of Word2Vec that creates vector representations for variable-length pieces of text. This may allow for efficient comparison of entire resumes or job descriptions.

In some implementations, the system may use transformer-based models like BERT (Bidirectional Encoder Representations from Transformers) to generate contextualized word embeddings. These models may take into account the surrounding context of each word, providing more accurate representations of word meanings in different contexts.

The vectorization process may also involve dimensionality reduction techniques such as Principal Component Analysis (PCA) or t-SNE (t-distributed Stochastic Neighbor Embedding) to create more compact vector representations while preserving important information. In some cases, the vectorization process may use milvus for more compact vector representations.

By employing these text segmentation and vectorization techniques, the system may create rich, multi-dimensional representations of user data and job postings. These representations may then be used in the matching algorithm to identify relevant job opportunities for candidates based on various aspects of their profile and the job requirements.

The method 600 may involve various techniques for breaking down text into smaller parts and vectorizing both the parts and the whole. In some aspects, text may be segmented into sentences, paragraphs, or individual words. Natural language processing techniques may be employed to extract keywords or key phrases from the text.

For sentence-level segmentation, the system may use punctuation and capitalization rules to identify sentence boundaries. Paragraph breaks may be detected through line breaks or indentation. Word tokenization may involve splitting text on whitespace and removing punctuation.

In some cases, more advanced natural language processing techniques may be used to identify named entities, extract noun phrases, or determine the syntactic structure of sentences. These techniques may provide additional context and meaning to the extracted text segments.

The system may employ various algorithms to vectorize the text segments and the full text. One approach may involve using term frequency-inverse document frequency (TF-IDF) vectorization. This method may assign numerical scores to words based on their frequency in a document and their rarity across all documents in the corpus.

Another vectorization technique that may be used is Word2Vec, which creates dense vector representations of words based on their context in large text corpora. This approach may capture semantic relationships between words, allowing for more nuanced comparisons.

For longer text segments or entire documents, the system may use Doc2Vec, an extension of Word2Vec that creates vector representations for variable-length pieces of text. This may allow for efficient comparison of entire resumes or job descriptions.

In some implementations, the system may use transformer-based models like BERT (Bidirectional Encoder Representations from Transformers) to generate contextualized word embeddings. These models may take into account the surrounding context of each word, providing more accurate representations of word meanings in different contexts.

The vectorization process may also involve dimensionality reduction techniques such as Principal Component Analysis (PCA) or t-SNE (t-distributed Stochastic Neighbor Embedding) to create more compact vector representations while preserving important information.

By employing these text segmentation and vectorization techniques, the system may create rich, multi-dimensional representations of user data and job postings. These representations may then be used in the matching algorithm to identify relevant job opportunities for candidates based on various aspects of their profile and the job requirements.

In the method 600, the platform 105 may employ vector functions to filter the second set of postings to a third set using user vectors and posting vectors. These vector functions may utilize various techniques to compare the high-dimensional representations of user profiles and job postings, allowing for more nuanced and semantic-based matching.

Vector distance calculations may be used to quantify the similarity between user vectors and posting vectors. For example, the system may compute cosine similarity between vectors, which measures the cosine of the angle between two vectors in the high-dimensional space. A higher cosine similarity value may indicate a closer match between a user profile and a job posting. The system may set a threshold cosine similarity value to filter out less relevant postings.

Another approach may involve using Euclidean distance or Manhattan distance to measure the similarity between vectors. In this case, a smaller distance may indicate a better match. The system may rank postings based on their distance from the user vector and select the top N closest matches for the third set of postings.

Clustering techniques may also be applied to group similar user vectors and posting vectors. For instance, the system may use k-means clustering or hierarchical clustering algorithms to organize vectors into clusters based on their similarity. This approach may allow for efficient matching by first identifying which cluster a user vector belongs to and then comparing it primarily with posting vectors within the same or nearby clusters.

The vector functions may incorporate weighting schemes to emphasize certain aspects of the vectors over others. For example, if certain skills or experiences are deemed more important for a particular job category, the corresponding dimensions in the vector space may be given higher weights when calculating similarities or distances.

The system may also employ a scoring mechanism that combines multiple vector comparison techniques. For instance, it may calculate a composite score for each posting based on a weighted sum of cosine similarity, Euclidean distance, and cluster membership. Postings with scores above a certain threshold may be included in the third set.

In some implementations, the vector functions may use machine learning models trained on historical matching data to predict the likelihood of a successful match between a user vector and a posting vector. These models may take the vector representations as input and output a probability or score indicating the potential match quality.

Examples of how these vector functions may be applied include:
1. A software engineer's skill vector may be compared against job posting vectors using cosine similarity. Postings with a similarity above 0.8 may be included in the third set.
2. A marketing professional's experience vector may be clustered with similar profiles, and then compared primarily with job postings in the same or adjacent clusters.
3. For a data scientist role, the vector function may apply higher weights to dimensions representing machine learning and statistical analysis skills when calculating vector distances.
4. A composite score for an accounting position may be calculated as: 0.5 cosine similarity+0.3 (1/euclidean_distance)+0.2 cluster_overlap_score.
5. A neural network model may be used to predict match quality scores between user vectors and posting vectors, with scores above 0.7 qualifying for the third set of postings.

By applying these vector functions, the method 600 may further refine the set of job postings, identifying more relevant and nuanced matches that may not have been captured by the parameter-based filtering alone. This approach may allow for a more sophisticated understanding of the relationship between user profiles and job requirements, leading to higher quality matches and improved user satisfaction with the job recommendation system.

If there are zero postings in the third set (No branch of step 624), the process returns to step 618 to wait for a match trigger. If there is at least one posting in the third set (Yes branch of step 624), the method 600 concludes with step 626, where the third set of postings is output.

The output may be presented to the user through the user interface 202 of the platform 105. The output may include a list or grid of job postings that match the user's profile based on the user parameters, user vectors, posting parameters, and posting vectors. The output may also include additional information about each posting, such as the job description, employer details, job requirements, and other relevant information.

In some cases, the output may also rank the posting. The ranking of postings for presentation to the user may be informed by a combination of vector scores, distances, or similarity scores, with (or without) quantified parameter comparisons. This multi-faceted approach may allow for a more comprehensive and nuanced ranking system that takes into account both structured data and unstructured textual information.

In some aspects, the system may calculate a composite score for each posting that incorporates both the vector-based similarity measures and the parameter-based comparisons. This composite score may be used to rank the postings in order of relevance to the user.

The vector scores, such as cosine similarity or other similarity metrics, may provide a measure of how closely the textual content of a job posting aligns with the user's profile. These scores may capture semantic relationships and contextual information that might not be apparent from structured data alone.

Distances in the vector space, such as Euclidean or Manhattan distances, may offer another perspective on the similarity between user profiles and job postings. In some implementations, these distances may be inversely related to the ranking, with smaller distances corresponding to higher ranks.

The system may also incorporate the results of the parameter-based comparisons into the ranking process. For example, postings that meet or exceed a certain number of the user's quantified preferences (e.g., salary range, location, required skills) may be given a boost in the rankings.

In some cases, the system may use a weighted sum approach to combine these different factors. The weights may be adjusted based on the specific job category, user preferences, or historical data on successful matches. For instance:

$$\text{Ranking Score} = w1 \text{ vector similarity} + w2(1/\text{vector\_distance}) + w3 \text{ parameter\_match\_score}$$

Where w1, w2, and w3 are weights that sum to 1, and parameter_match_score is a normalized score representing how well the posting matches the user's quantified parameters.

The system may also employ machine learning algorithms to optimize the ranking process. These algorithms may learn from user interactions, interview outcomes, and job placements to refine the weights and scoring mechanisms over time, improving the relevance of the presented job postings.

In some implementations, the ranking process may also consider the clustering results. Postings from clusters that closely match the user's profile may be given priority in the rankings, while still allowing for some diversity in the presented options.

The final ranked list of postings presented to the user may represent a balance between close matches based on vector similarity, alignment with quantified parameters, and some element of exploration to introduce the user to a diverse range of relevant opportunities.

The combination of fixed (quantified parameters) and fuzzy (vectors) filtering in the platform may enable efficient and accurate comparison of millions of users and postings, resulting in faster search results while maintaining accuracy. This approach may address the computational challenges associated with pairwise comparisons in large datasets.

In the initial filtering stage, the system may use fixed parameters to quickly eliminate a large number of irrelevant matches. These parameters may include location preferences, salary ranges, required qualifications, and other easily quantifiable criteria. This step may significantly reduce the number of potential matches that need to be processed in subsequent stages, improving overall system performance.

Following the initial parameter-based filtering, the system may apply vector-based techniques to the reduced set of potential matches. The use of vector representations for user profiles and job postings may allow for more nuanced comparisons that capture semantic relationships and contextual information. These vector representations may be precomputed and stored, reducing the computational load during the matching process.

The system may employ various optimization techniques to further enhance performance. For example, clustering algorithms may be used to group similar user vectors and posting vectors. This approach may allow for efficient matching by first identifying which cluster a user vector belongs to and then comparing it primarily with posting vectors within the same or nearby clusters, reducing the number of comparisons required.

To address the challenge of periodic re-runs and updates to profiles or postings, the system may implement incremental update mechanisms. Instead of reprocessing all data, the system may only update the affected vectors or parameters. For example, if a user updates their skills, only the relevant portions of their vector representation may need to be recalculated. Similarly, for new job postings, the system may only need to compute their vector representations and add them to the appropriate clusters.

The platform may also employ caching strategies to store frequently accessed data or intermediate results. This approach may reduce the need for repeated calculations, improving response times for common queries.

In some implementations, the system may use distributed computing techniques to parallelize the matching process across multiple servers or processors. This may allow for simultaneous processing of different subsets of the data, reducing overall computation time.

The platform may also implement adaptive matching algorithms that learn from user interactions and feedback. Over time, these algorithms may become more efficient at identifying relevant matches, reducing the number of comparisons needed to produce accurate results.

By combining these various techniques and optimizations, the platform may be able to handle large-scale matching tasks efficiently, providing fast and accurate results even when dealing with millions of users and postings. This approach may allow for frequent updates and re-runs of searches without significantly degrading user experience or system performance.

In some aspects, the method 600 may include additional steps or variations. For example, the method 600 may include additional steps for handling rescheduling or cancellation of interviews, handling job offers and acceptances, or providing additional services or features to the candidates or the employers. The method 600 may also include variations in the profile creation process, the matching process, the interview scheduling process, or other processes based on the specific requirements or preferences of the candidates or the employers.

In some implementations, the platform may employ a two-phase matching algorithm to efficiently process and match candidates with job opportunities. The first phase may involve filtering job postings based on specific criteria such as location, sponsorship requirements, and compliance-related factors. This initial filtering may help to quickly narrow down the pool of potential matches.

In the second phase, the platform may utilize a weighted scoring logic across multiple criteria to evaluate the remaining job opportunities. This scoring process may incorporate various factors including language matching, education and experience alignment, skills matching, and a semantic match score.

The platform may employ vectorization techniques for complex text fields such as skills, job descriptions, prior employment descriptions, and employer names. These fields may be vectorized using BERT (Bidirectional Encoder Representations from Transformers) or similar models. The resulting vectors may be consolidated and compared using cosine similarity measures.

For the semantic match score component, the platform may compare the BERT-vectorized values to existing values to determine similarity and output a criteria score. This approach may allow for more nuanced comparisons that capture semantic relationships between textual data in candidate profiles and job postings.

The platform may also incorporate skills clustering based on the collected skill vectors. This clustering approach may enable the system to identify similar skills and assign a "skills potential" score for candidates. This score may provide value for directly matching skills and partial values for related skills, potentially expanding the range of job opportunities a candidate may be considered for.

In some cases, the vectorization and similarity-based clustering may use cosine similarity and greedy clustering logic. This approach may allow for efficient grouping of similar skills or job attributes, potentially improving the overall matching process.

The platform may implement a flexible weighting system for different matching criteria. This may allow for adjustments to the importance of various factors in the matching process, potentially tailored to specific job categories or employer preferences.

4. Platform User Interfaces

FIGS. 7A-7I depict graphical user interfaces 700A-700I of the platform 105.

The present disclosure relates to an integrated job application and interview scheduling platform that streamlines the recruitment process for both candidates and employers. In some aspects, the platform may provide a unified application submission process, allowing candidates to submit a single comprehensive application that can be considered for multiple job opportunities across various employers. The platform may incorporate a sophisticated matching algorithm that efficiently compares candidate profiles with job listings using a combination of fixed parameter matching and fuzzy vector-based matching techniques. In certain implementations, the platform may enable real-time interview scheduling based on employer availability, reducing delays typically associated with the hiring process. The platform may, in some cases, include features such as employer-specific supplemental questions, AI-assisted resume parsing, and automated compliance checks. By integrating multiple functionalities into a cohesive system, the platform may enhance operational efficiency and user experience throughout the recruitment lifecycle. In some aspects, the platform's approach may foster a more dynamic and responsive job market by streamlining application submission, job matching, and interview scheduling processes.

FIG. 7A depicts a role matches interface 700A for an integrated job application and scheduling system. The role matches interface 700A may be part of a user interface that facilitates application submission, match display, and scheduling. In some aspects, the role matches interface 700A may be displayed to candidates after a matching process has been performed using user data received through the user interface.

The role matches interface 700A may present multiple job opportunities, each in a separate card-like format. In some implementations, each role match card may contain detailed information about the job, including the employer name and logo, job title, location (e.g., city/state), role type (e.g., part-time, full-time), workplace type (e.g., remote, on-site), and department. This comprehensive display of information allows candidates to quickly assess the key aspects of each matched opportunity.

In some aspects, each role match card may include a "Click for Role Details" button (e.g., that links to FIG. 7B), allowing users to view more information about the specific job opportunity. This feature enables candidates to easily access additional details about positions that interest them.

The role matches interface 700A may also include a star icon on each card. In some implementations, this star icon may allow users to mark as liked or save preferred roles. This functionality can help candidates organize and prioritize the opportunities presented to them. In some cases, the system may apply a bonus score to historically starred roles that reappear for role matching for the candidate. The platform may also cluster role vectors of starred roles and apply cluster logic to utilize the "like" feature to score bonus similar active roles to potentially no longer active "liked" roles.

The interface may provide instructions for users to explore available roles and select an interview opportunity. In some cases, the interface may mention that users can indicate their preferences by clicking the star icon, which may help tailor their experience.

The role matches interface 700A may represent the output of a third set of postings through the user interface, as described herein. These postings may have been filtered and matched to the candidate's profile using sophisticated algorithms that consider both fixed parameters and vector-based comparisons.

By presenting matched opportunities in this organized and detailed manner, the role matches interface 700A streamlines the job application process for candidates. It allows them to efficiently review and interact with their job matches, leading to quicker and more relevant interview scheduling. This interface exemplifies how the system integrates application submission, match display, and scheduling into a cohesive user experience.

FIG. 7B depicts a job details interface 700B for an integrated job application and scheduling system. The job details interface 700B may display comprehensive information about a selected job opportunity, allowing candidates to review detailed job information before proceeding with the application process.

In some aspects, the job details interface 700B may be presented to a candidate after they have selected a specific job posting from a list of matches. This interface may be part of the process of obtaining posting data for job listings and receiving a selection of a job posting from a set of matched postings.

The job details interface 700B may include a banner image at the top, which may be provided by the employer to visually represent their brand or the specific job opportunity. Below the banner, the interface may be divided into sections providing various details about the job.

In some implementations, the job details interface 700B may display the employer name prominently, allowing candidates to quickly identify the company offering the position. The job title may also be clearly presented, giving candidates an immediate understanding of the role they are considering.

The job details interface 700B may include a detailed role description section. This section may provide candidates with a comprehensive overview of the job responsibilities, required qualifications, and any other relevant information about the position. In some cases, this description may be derived from the posting data obtained for the job listing.

The interface may also present sections for preferred skills and preferred certifications. These sections may highlight specific qualifications or expertise that the employer is seeking in ideal candidates. This information may be used in the matching process to identify suitable candidates for the role.

In some aspects, the job details interface 700B may display an employer profile, providing additional context about the company offering the position. This may include information about the company's culture, mission, or other relevant details that could help candidates assess their potential fit with the organization.

The interface may include a link to the employer's website, allowing candidates to easily access more information about the company if desired. Additionally, there may be a link to the employer's privacy policy, ensuring transparency and compliance with data protection regulations.

At the bottom of the job details interface 700B, the disclosed annual salary range for the position may be displayed. This information can be crucial for candidates in evaluating whether the opportunity aligns with their compensation expectations.

To facilitate the application process, the job details interface 700B may include a button labeled "Select for Interview" at the bottom. This button allows users to proceed with the application process, moving to the next step of scheduling an interview or answering supplemental questions.

The comprehensive information provided in the job details interface 700B may enable candidates to make informed decisions about whether to pursue the opportunity. By presenting detailed job information in a clear and organized manner, the system may enhance the efficiency of the job application process and improve the quality of matches between candidates and job opportunities.

Figure 7C:

FIG. 7C depicts a supplemental questions interface 7000 for an integrated job application and interview scheduling system. The supplemental questions interface 7000 may be presented to candidates after they have selected a specific job role for an interview. In some aspects, this interface serves as an additional screening step before allowing candidates to proceed to the interview scheduling process.

The supplemental questions interface 7000 may include a header with the platform name and a "Cancel Reservation—Go Back to Role Matches" button in the top right corner. This button may allow candidates to return to the previous screen if they decide not to proceed with the current job application.

In some implementations, the main content area of the supplemental questions interface 7000 may contain instructions for the candidate. These instructions may explain that responses are required for each question and will determine eligibility to schedule an interview. This information helps set clear expectations for the candidate regarding the purpose and importance of the supplemental questions.

The supplemental questions interface 7000 may present a series of role/employer-specific questions. In some cases, these questions may be customized by the employer for each job posting, allowing them to gather additional information relevant to the specific role or company requirements. The number and nature of these questions may vary depending on the employer's preferences and the job requirements.

Each question on the supplemental questions interface 7000 may be accompanied by a dropdown menu for selecting a response. This format allows for standardized answers, which may facilitate easier processing and evaluation of the responses. In some implementations, the dropdown options may be limited to "Yes" or "No" responses, as indicated in herein.

At the bottom of the supplemental questions interface 7000, there may be a "Save & Continue" button for submitting the responses and proceeding with the application process. This button may trigger the system to evaluate the candidate's responses against the employer's criteria before allowing them to move forward to the interview scheduling stage.

The supplemental questions interface 7000 exemplifies how the platform integrates employer-specific requirements into the application process. By collecting additional information tailored to each job role, the system may enhance the matching process and help ensure that candidates who proceed to the interview stage meet the basic qualifications set by the employer. This feature may contribute to the efficiency of the overall recruitment process by reducing the number of unsuitable candidates reaching the interview stage.

Figure 7D:

FIG. 7D depicts an interview scheduling interface 700D for an integrated job application and scheduling system. The interview scheduling interface 700D may be part of a matching and scheduling module designed to automate the matching process and facilitate direct interview scheduling based on real-time employer availability.

In some aspects, the interview scheduling interface 700D may display a calendar view with available interview time slots for a selected date range. The header of the interface may include the platform name and instructions for the user to schedule their interview. This interface may be presented to candidates after they have selected a job posting and completed any required supplemental questions.

The calendar view in the interview scheduling interface 700D may show dates for a specific week with navigation options to view previous and next weeks. Each day column may display multiple one-hour interview slots represented by green rectangular buttons. The time slots may be labeled with the interview duration and the specific start and end times.

In some implementations, the interview scheduling interface 700D may retrieve real-time availability data for an employer associated with the selected job posting. This real-time availability data may be used to populate the calendar view with available interview slots. The system may integrate with employer calendars or scheduling systems to ensure that the displayed availability is up-to-date and accurate.

The interview scheduling interface 700D may allow users to select their preferred interview time by clicking on an available slot. This direct selection process streamlines the scheduling workflow, eliminating the need for back-and-forth communications between candidates and employers to find a suitable interview time.

In some aspects, the layout of the interview scheduling interface 700D may provide a clear visual representation of the employer's availability, enabling efficient scheduling without manual coordination. This automated scheduling feature integrates seamlessly with the overall job application process, facilitating a smooth transition from application submission to interview scheduling.

The interview scheduling interface 700D exemplifies how the system may present available interview time slots based on real-time availability data. By offering this direct scheduling capability, the platform may significantly reduce the time and effort typically required to coordinate interviews, accelerating the hiring process for both candidates and employers.

Figure 7E:
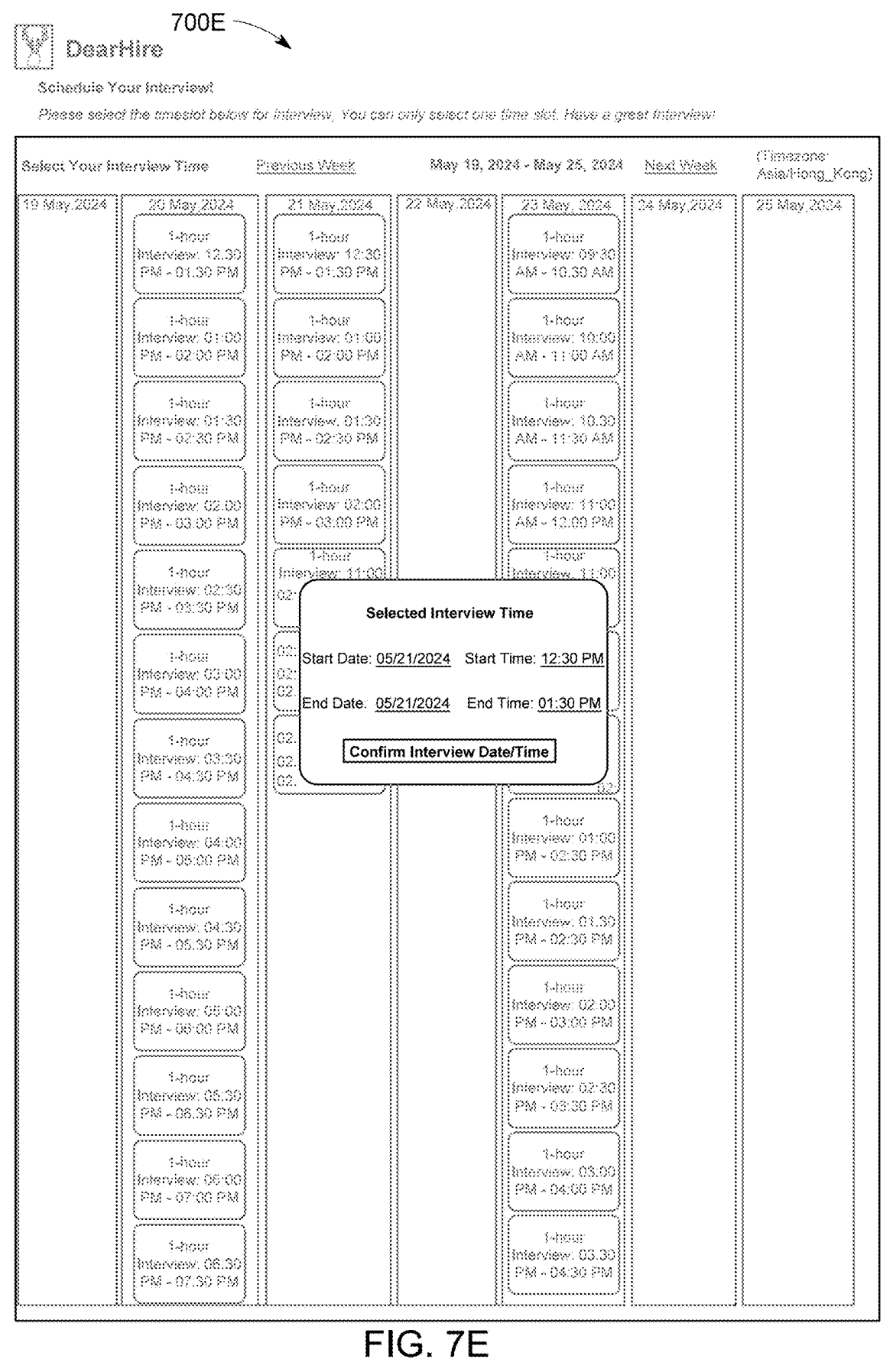

FIG. 7E depicts an interview scheduling interface 700E with a pop-up window for an integrated job application and scheduling system. The interview scheduling interface 700E may allow users to view information for available interview slots across multiple days and select a preferred time for their interview.

In some aspects, the interview scheduling interface 700E may display a calendar view similar to that shown in FIG. 7D, presenting available interview time slots for a selected date range. The interface may include navigation options to view different weeks or date ranges, allowing candidates to find a suitable interview time that aligns with their schedule.

The interview scheduling interface 700E may feature a pop-up window in the center of the interface that displays details of a selected interview time. This pop-up window may appear when a candidate clicks on an available time slot, providing additional information before confirming the selection. In some implementations, the pop-up window may show the specific start and end times of the interview, the interview format (e.g., phone, video call, or in-person), and any additional instructions or requirements for the interview.

The system may receive a selection of an interview time slot when a candidate confirms their choice through the pop-up window. Upon receiving this selection, the system may proceed to schedule the interview for the selected time slot. In some cases, this may involve updating both the employer's and the candidate's calendars, as well as recording the scheduled interview in the platform's database.

By providing a clear visual representation of available interview slots and offering detailed information through a pop-up window, the interview scheduling interface 700E may streamline the process of selecting and confirming interview times. This approach may reduce scheduling conflicts and improve the overall efficiency of the interview scheduling process within the integrated job application and scheduling system.

FIG. 7F depicts a user interface 700F for an integrated job application and scheduling platform. The user interface 700F may provide a comprehensive dashboard for users to manage their job search activities and gain insights into job market trends.

In some aspects, the user interface 700F may include a navigation menu on the left side with options such as "Home", "Check for New Matches", "Profile", "Give Feedback", "Settings", and "Change Password". This menu structure allows users to easily access different sections of the platform and manage their account settings.

The main content area of the user interface 700F may display a welcome message and provide an overview of the user's activity on the platform. In some implementations, key statistics may be presented at the top of the interface, including the number of scheduled interviews, unique roles matched, active roles in the marketplace, and the date the user joined the platform. These statistics may offer users a quick snapshot of their job search progress and the platform's current job market activity.

The user interface 700F may include a calendar view showing upcoming interviews. For example, the calendar may display a specific week, with any interviews scheduled during that week. This feature allows users to easily track their upcoming interview commitments.

In some aspects, the user interface 700F may provide interactive feedback to candidates about their scheduled first-round interviews. This may include automated confirmation notifications for scheduled interviews, which could appear as pop-up messages or be integrated into the calendar view. The system may also generate adaptive reminders based on scheduled interview dates and times, helping candidates prepare adequately for each opportunity. Additionally, the interface may display real-time updates on changes to scheduled interviews, ensuring that candidates always have the most current information.

The lower portion of the user interface 700F may contain analytical sections to provide users with valuable insights. On the left, a "Role Category Analysis" graph may display data related to job categories, showing the distribution of matched roles across different industries or job types. On the right, a "Most In Demand Skills" chart may list skills such as AI, Coding, and Blockchain, with horizontal bars indicating their relative demand in the job market. These analytical features can help users understand current job market trends and guide their skill development efforts.

The user interface 700F may facilitate the process of scheduling an interview for a selected time slot. When a user selects an available interview slot, the system may automatically update the calendar view to reflect the new appointment. The interface may then display a confirmation message and offer options for adding the interview to the user's personal calendar or setting up additional reminders.

By providing a centralized dashboard with comprehensive job search management tools and market insights, the user interface 700F exemplifies how the platform integrates various aspects of the job application and interview scheduling process into a cohesive user experience. This interface may enhance user engagement and satisfaction by offering easy access to relevant information and tools for managing their job search effectively.

Figure 7G:
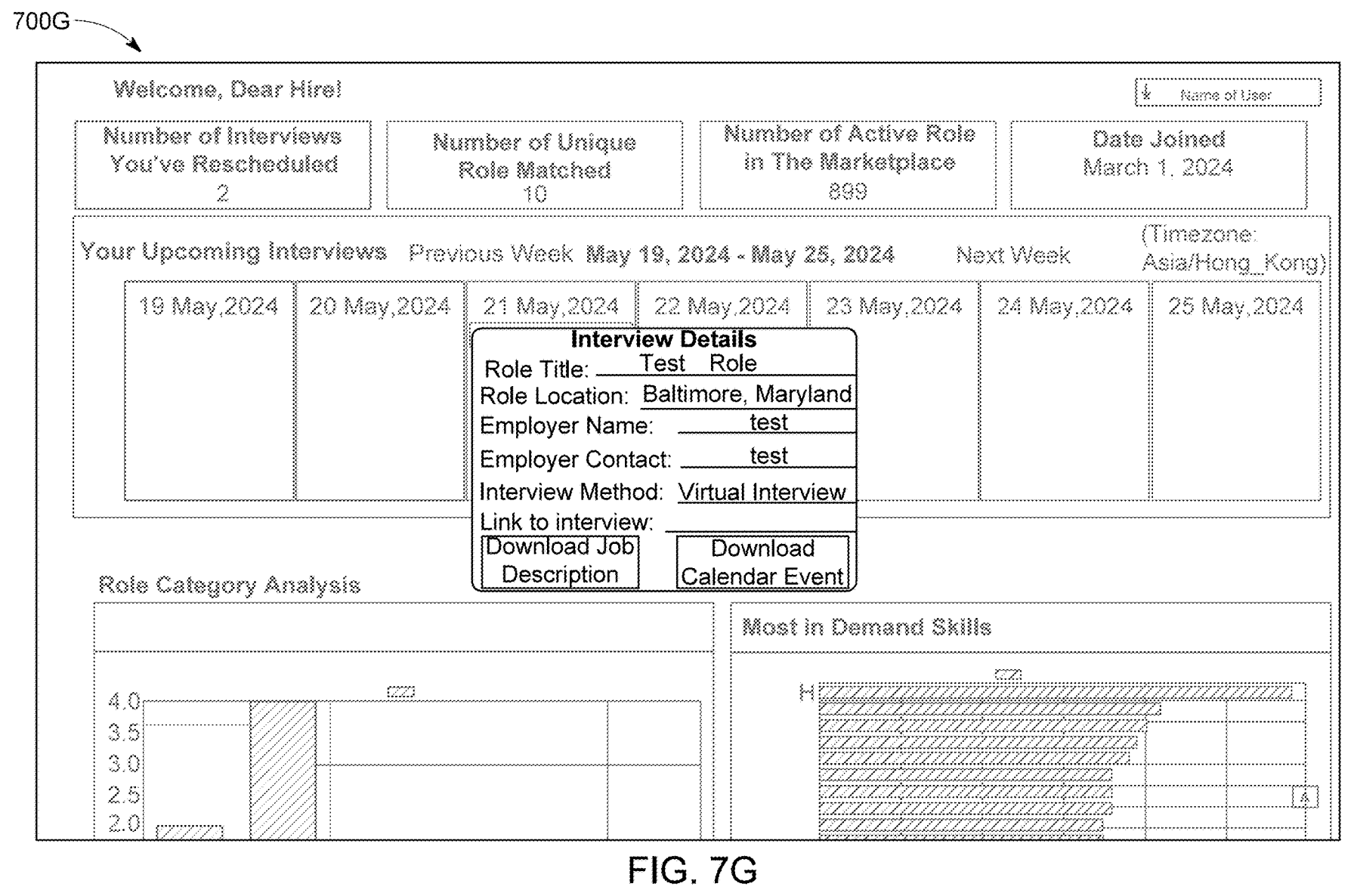

FIG. 7G depicts a user interface 700G for an integrated job application and interview scheduling system with a pop-up window in the center that displays details of a selected interview time, including the start and end times, and a link to the interview.

In some aspects, the user interface 700G may be presented to a candidate after they have selected an available interview time slot. The pop-up window may serve as a confirmation step, allowing the candidate to review the selected interview details before finalizing the scheduling process.

The pop-up window in the user interface 700G may include specific information about the scheduled interview, such as the date, start time, and end time. This clear presentation of interview details helps ensure that candidates are fully aware of the timing of their upcoming interview. In some implementations, the pop-up window may also display the interview format (e.g., phone, video call, or in-person) and any additional instructions or requirements for the interview.

The user interface 700G may include a link to the interview within the pop-up window. This link may provide direct access to the interview platform or additional information about how to join the interview. For video interviews, the link may connect directly to the video conferencing software. For phone interviews, it may provide the call-in number and any necessary access codes.

Upon confirming the interview details through the user interface 700G, the system may send automated notifications to both the candidate and the employer about the scheduled interview. These notifications may be sent via email, text message, or through the platform's internal messaging system, depending on user preferences and system settings.

The automated notifications may include comprehensive details about the scheduled interview, such as:

1. Date and time of the interview
2. Interview format (e.g., phone, video, in-person)
3. Duration of the interview
4. Name and title of the interviewer (if available)
5. Any preparation instructions or materials
6. Links or access information for virtual interviews
7. Contact information for rescheduling or questions In some implementations, the system may send different notifications to the candidate and the employer, tailoring the information to each party's needs. For example, the employer's notification may include a link to the candidate's profile or resume, while the candidate's notification may include information about the company and the specific role.

The automated notification system may also be configured to send reminder notifications to both parties as the interview date approaches. These reminders may be sent at predetermined intervals (e.g., one week before, one day before, and one hour before the interview) and may include any updated information or last-minute instructions.

By providing clear interview details through the user interface 700G and sending comprehensive automated notifications, the system streamlines the interview scheduling process and helps ensure that all parties are well-informed and prepared for the upcoming interview. This approach may reduce scheduling conflicts, improve interview attendance rates, and enhance the overall efficiency of the recruitment process.

Figure 7H:
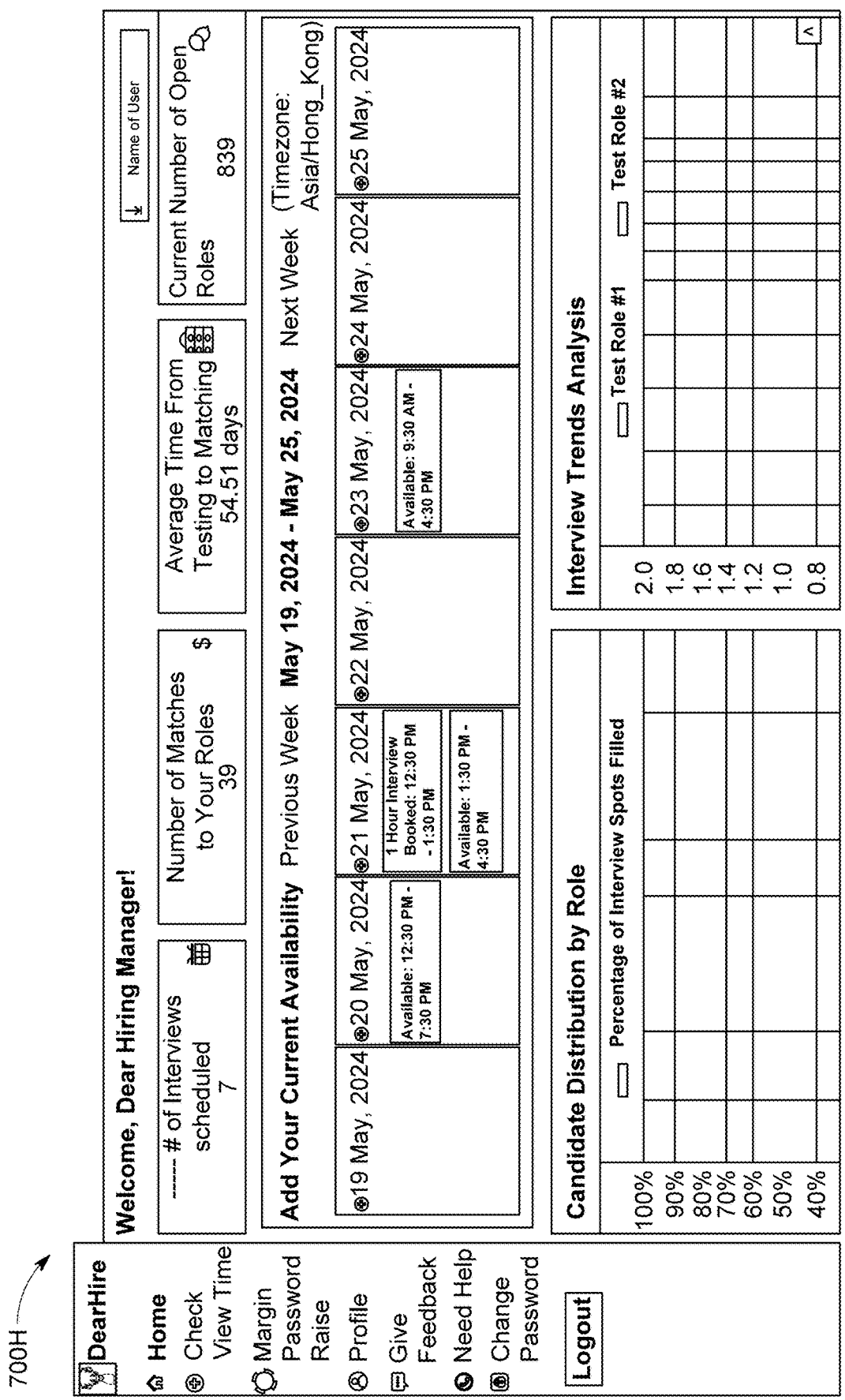

FIG. 7H depicts an employer dashboard 700H for an integrated job application and interview scheduling system. The employer dashboard 700H may provide a comprehensive overview of recruitment activities and facilitate efficient management of the hiring process.

In some aspects, the employer dashboard 700H may include a navigation menu on the left side with options such as Home, Create New Job, Manage Posted Jobs, Profile, Give Feedback, and Help. These options may allow employers to easily access different functionalities of the platform and manage their recruitment activities.

The main content area of the employer dashboard 700H may display a welcome message and provide an overview of key metrics related to the employer's recruitment activities. In some implementations, these metrics may include the total number of interviews scheduled, number of candidates in the hiring pipeline, average time from post to interview, and current number of open roles. These metrics may offer employers a quick snapshot of their recruitment progress and efficiency.

The employer dashboard 700H may include a calendar interface labeled "Add Your Current Availability" that allows employers to manage their interview availability for the upcoming week. This feature may integrate with the scheduling module of the platform, enabling real-time updates to interview availability and streamlining the scheduling process for both employers and candidates.

In some aspects, the lower portion of the employer dashboard 700H may contain graphical representations of recruitment data. For instance, a "Candidate Distribution by Role" chart may show the percentage breakdown of candidates across different job roles. This visualization may help employers understand which positions are attracting the most candidates and identify areas where they may need to adjust their recruitment strategies.

The employer dashboard 700H may also include an "Interview Trends Analysis" graph, which may compare data points over time. This graph may show interview-related metrics for different periods, allowing employers to track trends in their recruitment process and identify areas for improvement.

By providing a centralized interface for managing job postings, tracking recruitment metrics, and analyzing hiring trends, the employer dashboard 700H may enhance the efficiency and effectiveness of the recruitment process for employers using the integrated job application and interview scheduling system.

Figure 7I:
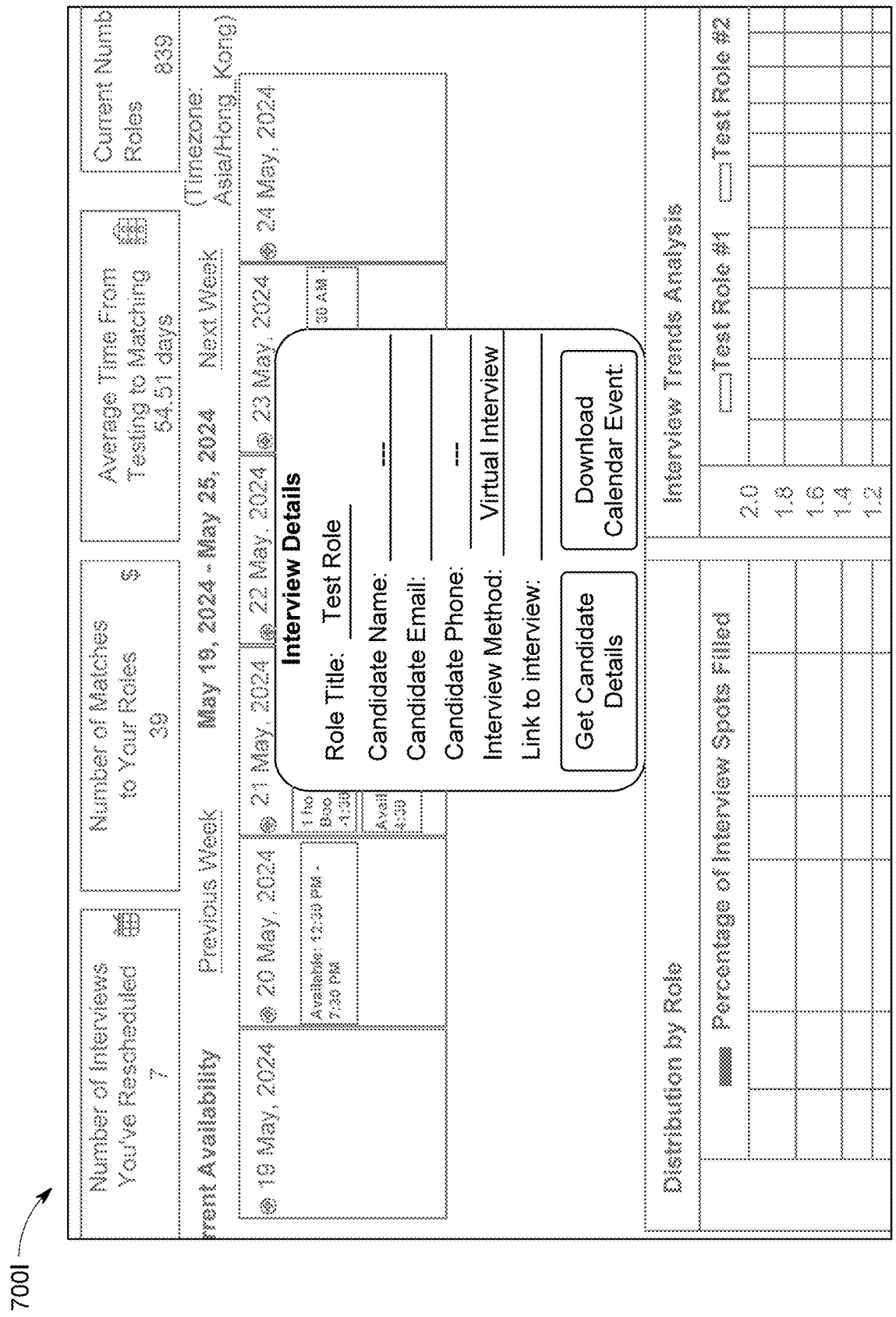

FIG. 7I depicts an employer dashboard 700I for an integrated job application and interview scheduling system with an interview details pop-up window that provides specific information about a scheduled interview. This feature may enhance the employer's ability to manage and prepare for upcoming interviews efficiently.

In some aspects, the interview details pop-up window may appear when an employer selects a specific interview from their schedule or list of upcoming interviews. The pop-up window may overlay the main dashboard interface, allowing employers to quickly access important interview information without navigating away from their current view.

The interview details pop-up window may display comprehensive information about the scheduled interview, including:
1. Role title: This may help employers quickly identify which position the interview is for, especially if they are hiring for multiple roles simultaneously.
2. Candidate name: Displaying the candidate's name prominently may help employers personalize their approach and easily reference the correct information during the interview.
3. Candidate email: This contact information may be useful for any pre-interview communications or follow-ups.
4. Candidate phone number: In case of technical difficulties with video interviews or for phone interviews, having the candidate's phone number readily available may be crucial.
5. Interview method: This may indicate whether the interview will be conducted via phone, video call, or in-person, helping employers prepare the appropriate setup.
6. Link to join the interview: For video interviews, a direct link to join the interview may be provided, streamlining the process of connecting with the candidate.

In some implementations, the interview details pop-up window may also include additional features such as:
A button to access the candidate's full profile or resume
Options to reschedule or cancel the interview
A notes section for employers to jot down pre-interview thoughts or post-interview feedback
Links to any pre-interview assessments or tasks completed by the candidate The employer dashboard 700I with the interview details pop-up window may exemplify how the system facilitates efficient management of the interview process. By providing quick access to crucial interview information, the system may help employers better prepare for each interview, leading to more effective and productive interactions with candidates.

The platform 105 may include a database to store and manage access to candidate profiles, job listings, and scheduling data. In some aspects, this database may be part of the data repository 208. The database may store comprehensive information about candidates, including their personal details, educational background, work history, skills, and job preferences. For job listings, the database may contain detailed information such as job descriptions, requirements, employer details, and other relevant data. The scheduling data stored in the database may include information about interview slots, employer availability, and scheduled interviews.

In some implementations, the platform 105 may incorporate a security module implementing security protocols to protect data integrity and confidentiality. This security module may employ various measures such as data encryption, secure data transmission protocols, and user authentication processes. The security module may regularly update privacy compliance measures to adhere to global data protection regulations, ensuring that all data handling practices align with relevant privacy laws.

The platform 105 may include a feedback loop mechanism that collects and analyzes post-interview feedback from both candidates and employers. This feedback may be used to continuously improve the matching and scheduling algorithms. In some cases, the feedback loop may employ data analysis techniques to identify trends and patterns in user feedback, which can be used to enhance the system's performance and user satisfaction.

In certain aspects, the matching and scheduling module of the platform 105 may incorporate AI-driven resume parsing. This feature may automatically extract and validate information from uploaded candidate documents, enhancing the accuracy of candidate profiles and job matches. The AI-driven resume parsing may use advanced text analysis techniques to accurately parse and extract information from resumes, reducing the time and effort required for profile creation.

The platform 105 may include a modular API framework for integration with third-party calendars and HR tools. This framework may allow the platform to access and utilize external services and data, enhancing its functionality and providing additional features and capabilities. In some implementations, this API framework may enable seamless integration with employer calendar systems, facilitating real-time updates to interview availability and streamlining the scheduling process.

The matching and scheduling module of the platform 105 may employ a combination of fixed and fuzzy matching techniques to efficiently and accurately compare candidate profiles with job postings. This hybrid approach allows for quick filtering based on exact criteria while also enabling more nuanced comparisons of text-based data.

In some aspects, the fixed matching techniques may compare exact values for criteria including location preferences, required qualifications, and salary range. For example, the system may filter out job postings that do not meet a candidate's minimum salary requirements or that are located outside of their preferred geographical area. This initial filtering based on quantifiable parameters can significantly reduce the number of potential matches that need to be processed in subsequent stages.

The fuzzy matching techniques may analyze text-based data including job titles, skills, and job descriptions to identify relevant matches. These techniques allow for partial matches and consider similarities rather than exact equivalence. For instance, the system may recognize that "Software Engineer" and "Software Developer" might be similar roles, even if the titles don't match exactly. This approach can capture semantic relationships and contextual information that might not be apparent from structured data alone.

To enable efficient comparison and analysis of text-based data, the matching and scheduling module may employ vectorization techniques. These techniques convert text-based data into vectors, which are numerical representations in a high-dimensional space. In some implementations, the vectorization process may include converting user text segments from candidate profiles and posting text segments from job listings into high-dimensional vectors.

The vectorization techniques may involve several steps:
1. Text segmentation: The system may break down text into smaller parts such as sentences, paragraphs, or individual words. Natural language processing techniques may be used to extract keywords or key phrases.
2. Feature extraction: Relevant features may be identified from the text, such as specific skills, experiences, or qualifications.
3. Numerical representation: The extracted features may be assigned numerical values based on various factors such as frequency of occurrence or importance.
4. Vector creation: These numerical values may be used to create a multi-dimensional vector that represents the text data.

By employing these vectorization techniques, the platform 105 may create rich, multi-dimensional representations of user data and job postings. These vector representations can then be used in the matching algorithm to identify relevant job opportunities for candidates based on various aspects of their profile and the job requirements.

The combination of fixed parameter matching and fuzzy vector-based matching may enable the platform 105 to perform efficient and accurate comparisons across large datasets of users and postings. This approach may address the computational challenges associated with pairwise comparisons in large datasets while maintaining the ability to capture nuanced relationships between candidate profiles and job requirements.

The matching and scheduling module may apply vector functions to compare user vectors and posting vectors to determine the similarity between candidate profiles and job postings. These vector functions may utilize various techniques to quantify the similarity between high-dimensional representations of user profiles and job listings.

In some implementations, the system may compute cosine similarity between vectors, which measures the cosine of the angle between two vectors in the high-dimensional space. A higher cosine similarity value may indicate a closer match between a user profile and a job posting. The system may set a threshold cosine similarity value to filter out less relevant postings.

Another approach may involve using Euclidean distance or Manhattan distance to measure the similarity between vectors. In this case, a smaller distance may indicate a better match. The system may rank postings based on their distance from the user vector and select the top N closest matches.

The matching and scheduling module may filter job postings in multiple stages to efficiently narrow down the most relevant opportunities for candidates. In some aspects, an initial filtering stage may use fixed parameters to quickly eliminate a large number of irrelevant matches. These parameters may include location preferences, salary ranges, required qualifications, and other easily quantifiable criteria.

Following the initial parameter-based filtering, the system may apply vector-based techniques to the reduced set of potential matches. This multi-stage approach may significantly reduce the number of potential matches that need to be processed in subsequent stages, improving overall system performance.

In some implementations, the matching and scheduling module may apply parameter functions to compare user parameters and posting parameters to determine the relevance of job postings for a user. These parameter functions may be mathematical functions or algorithms that compare the user parameters and posting parameters to determine the suitability of the postings for the user.

The vector functions may calculate similarity scores between user vectors and posting vectors. In some aspects, these similarity scores may be used to rank job postings, with higher scores indicating better matches. The system may employ various scoring mechanisms, such as a weighted sum of different similarity metrics, to produce a final ranking of job postings for presentation to the user.

By combining fixed parameter matching, vector-based comparisons, and multi-stage filtering, the matching and scheduling module may efficiently process large volumes of data while maintaining accuracy in identifying relevant job opportunities for candidates.

The matching and scheduling module may employ advanced techniques to calculate similarity scores between user vectors and posting vectors. In some implementations, cosine similarity may be used to quantify the similarity between these high-dimensional vector representations. Cosine similarity measures the cosine of the angle between two vectors, with values closer to 1 indicating greater similarity. For example, the system may compute the cosine similarity between a candidate's skill vector and a job posting's required skills vector to determine how closely they align.

In certain aspects, the matching and scheduling module may apply clustering algorithms to group similar user vectors and posting vectors. This approach can facilitate efficient matching by first identifying which cluster a user vector belongs to and then comparing it primarily with posting vectors within the same or nearby clusters. For instance, the system may use k-means clustering to organize candidate profiles into groups based on similar skills or experience levels, and then focus on matching candidates within a cluster to job postings that align with that cluster's characteristics.

The matching and scheduling module may assign different weights to various components of the user vectors and posting vectors based on their relative importance in determining job suitability. For example, recent work experience or specific technical skills may be given higher weights compared to other attributes when calculating similarity scores. This weighting scheme allows the system to prioritize certain aspects of a candidate's profile or job requirements that are deemed more critical for successful matches.

In some implementations, the process of extracting user parameters and user text segments from the user data may involve natural language processing techniques. The system may analyze the textual content of resumes, cover letters, or other application materials to identify key information such as skills, job titles, and educational qualifications. This extracted information may then be used to construct the user vectors and parameters for matching purposes.

The conversion of user text segments into user vectors using vectorization techniques may involve several steps. In some aspects, the system may employ word embedding models such as Word2Vec or GloVe to convert individual words or phrases into dense vector representations. These word vectors may then be combined, for example through averaging or weighted summation, to create a single vector representation of larger text segments or entire documents. Additionally, techniques like TF-IDF (Term Frequency-Inverse Document Frequency) may be applied to adjust the importance of different terms based on their frequency in the document and across the entire corpus of job-related texts.

By utilizing these advanced matching techniques, the platform may enhance its ability to identify relevant job opportunities for candidates while efficiently processing large volumes of data. The combination of vector similarity calculations, clustering algorithms, and weighted component analysis allows for nuanced comparisons between candidate profiles and job postings, leading to more accurate and satisfying matches for both job seekers and employers.

The platform 105 may store user parameters and user vectors in a database associated with a user ID. This database may be part of the data repository 208 and may contain comprehensive information about each candidate, including their personal details, educational background, work history, skills, and job preferences. The user ID may be a unique identifier assigned to each user, allowing for efficient retrieval and management of user data.

In some aspects, the platform 105 may extract posting parameters and posting text segments from job posting data. The posting parameters may include various attributes or characteristics of the job postings, such as job requirements, job location, salary range, and other relevant parameters. The posting text segments may include portions of text from the job descriptions or other relevant text.

The platform 105 may convert posting text segments into posting vectors using vectorization techniques. This process may involve similar methods to those used for user text segments, such as employing word embedding models or TF-IDF techniques. The resulting posting vectors may represent the job postings in a high-dimensional feature space, allowing for efficient comparison and analysis of text-based data.

In some implementations, the platform 105 may store posting parameters and posting vectors in the database associated with a posting ID. The posting ID may be a unique identifier assigned to each job posting, facilitating efficient retrieval and management of posting data.

The platform 105 may evaluate a match trigger to initiate a matching process. The match trigger may be a signal or event that prompts the system to begin comparing user profiles with job postings. In some cases, this trigger may be based on various factors, such as the completion of a user's profile, the submission of a new job application, or the addition of new job postings to the system. The matching process may be initiated automatically when certain conditions are met, or it may be manually triggered by users or administrators of the platform.

Upon detecting a match trigger, the platform 105 may obtain a first set of postings. This first set may include all current job postings in the system or a subset based on certain broad criteria. In some implementations, the platform 105 may retrieve these postings from the data repository 208.

The platform 105 may then filter the first set of postings to a second set using user parameters, posting parameters, and parameter functions. This filtering process may involve comparing quantifiable attributes of the user profile with corresponding requirements in the job postings. For example, the system may filter out postings that do not meet the user's minimum salary requirements or are located outside the user's preferred geographical area. In some aspects, the parameter functions may apply logical expressions or mathematical calculations to determine the relevance of each posting.

Following the parameter-based filtering, the platform 105 may further refine the results by filtering the second set of postings to a third set using user vectors, posting vectors, and vector functions. This stage may involve more nuanced comparisons of text-based data, such as job descriptions and candidate skills. The vector functions may calculate similarity scores between user vectors and posting vectors, using techniques like cosine similarity or Euclidean distance. In some implementations, the platform 105 may rank the postings based on these similarity scores, presenting the most relevant opportunities to the user.

After the interview process, the platform 105 may collect post-interview feedback from both the candidate and the employer. This feedback may be gathered through structured questionnaires or open-ended responses via the user interface 202. In some aspects, the feedback may cover various aspects of the interview experience, the perceived match quality, and any additional insights gained during the interaction.

The platform 105 may use the collected feedback to update and improve the matching process for future accuracy. This may involve adjusting the weights assigned to different parameters or refining the vector comparison algorithms. In some implementations, machine learning techniques may be employed to analyze patterns in successful matches and incorporate these insights into future matching iterations. By continuously refining its matching algorithms based on real-world outcomes, the platform 105 may enhance its ability to connect candidates with suitable job opportunities over time.

5. Computer System

Figure 8:
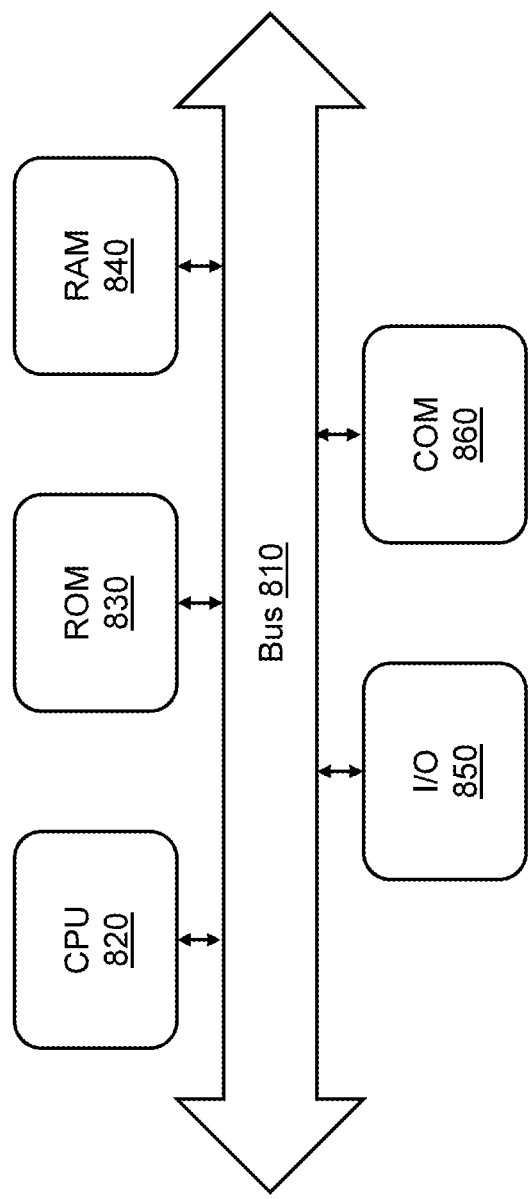
FIG. 8 depicts an example system that may execute techniques presented herein.

FIG. 8 depicts an example system that may execute techniques presented herein. FIG. 8 is a simplified functional block diagram of a computer that may be configured to execute techniques described herein, according to exemplary cases of the present disclosure. Specifically, the computer (or "platform" as it may not be a single physical computer infrastructure) may include a data communication interface 860 for packet data communication. The platform may also include a central processing unit ("CPU") 820, in the form of one or more processors, for executing program instructions. The platform may include an internal communication bus 810, and the platform may also include a program storage and/or a data storage for various data files to be processed and/or communicated by the platform such as ROM 830 and RAM 840, although the system 800 may receive programming and data via network communications. The system 800 also may include input and output ports 850 to connect with input and output devices such as keyboards, mice, touchscreens, monitors, displays, etc. Of course, the various system functions may be implemented in a distributed fashion on a number of similar platforms, to distribute the processing load. Alternatively, the systems may be implemented by appropriate programming of one computer hardware platform.

The general discussion of this disclosure provides a brief, general description of a suitable computing environment in which the present disclosure may be implemented. In some cases, any of the disclosed systems, methods, and/or graphical user interfaces may be executed by or implemented by a computing system consistent with or similar to that depicted and/or explained in this disclosure. Although not required, aspects of the present disclosure are described in the context of computer-executable instructions, such as routines executed by a data processing device, e.g., a server computer, wireless device, and/or personal computer. Those skilled in the relevant art will appreciate that aspects of the present disclosure can be practiced with other communications, data processing, or computer system configurations, including: Internet appliances, hand-held devices (including personal digital assistants ("PDAs")), wearable computers, all manner of cellular or mobile phones (including Voice over IP ("VoIP") phones), dumb terminals, media players, gaming devices, virtual reality devices, multi-processor systems, microprocessor-based or programmable consumer electronics, set-top boxes, network PCs, mini-computers, mainframe computers, and the like. Indeed, the terms "computer," "server," and the like, are generally used interchangeably herein, and refer to any of the above devices and systems, as well as any data processor.

Aspects of the present disclosure may be embodied in a special purpose computer and/or data processor that is specifically programmed, configured, and/or constructed to perform one or more of the computer-executable instructions explained in detail herein. While aspects of the present disclosure, such as certain functions, are described as being performed exclusively on a single device, the present disclosure may also be practiced in distributed environments where functions or modules are shared among disparate processing devices, which are linked through a communications network, such as a Local Area Network ("LAN"), Wide Area Network ("WAN"), and/or the Internet. Similarly, techniques presented herein as involving multiple devices may be implemented in a single device. In a distributed computing environment, program modules may be located in both local and/or remote memory storage devices.

Aspects of the present disclosure may be stored and/or distributed on non-transitory computer-readable media, including magnetically or optically readable computer discs, hard-wired or preprogrammed chips (e.g., EEPROM semiconductor chips), nanotechnology memory, biological memory, or other data storage media. Alternatively, computer implemented instructions, data structures, screen displays, and other data under aspects of the present disclosure may be distributed over the Internet and/or over other networks (including wireless networks), on a propagated signal on a propagation medium (e.g., an electromagnetic wave(s), a sound wave, etc.) over a period of time, and/or they may be provided on any analog or digital network (packet switched, circuit switched, or other scheme).

Program aspects of the technology may be thought of as "products" or "articles of manufacture" typically in the form of executable code and/or associated data that is carried on or embodied in a type of machine-readable medium. "Storage" type media include any or all of the tangible memory of the computers, processors or the like, or associated modules thereof, such as various semiconductor memories, tape drives, disk drives and the like, which may provide non-transitory storage at any time for the software programming. All or portions of the software may at times be communicated through the Internet or various other telecommunication networks. Such communications, for example, may enable loading of the software from one computer or processor into another, for example, from a management server or host computer of the mobile communication network into the computer platform of a server and/or from a server to the mobile device. Thus, another type of media that may bear the software elements includes optical, electrical and electromagnetic waves, such as used across physical interfaces between local devices, through wired and optical landline networks and over various airlinks. The physical elements that carry such waves, such as wired or wireless links, optical links, or the like, also may be considered as media bearing the software. As used herein, unless restricted to non-transitory, tangible "storage" media, terms such as computer or machine "readable medium" refer to any medium that participates in providing instructions to a processor for execution.

6. Terminology

The terminology used above may be interpreted in its broadest reasonable manner, even though it is being used in conjunction with a detailed description of certain specific examples of the present disclosure. Indeed, certain terms may even be emphasized above; however, any terminology intended to be interpreted in any restricted manner will be overtly and specifically defined as such in this Detailed Description section. Both the foregoing general description and the detailed description are exemplary and explanatory only and are not restrictive of the features, as claimed.

As used herein, the terms "comprises," "comprising," "having," including," or other variations thereof, are intended to cover a non-exclusive inclusion such that a process, method, article, or apparatus that comprises a list of elements does not include only those elements, but may include other elements not expressly listed or inherent to such a process, method, article, or apparatus.

In this disclosure, relative terms, such as, for example, "about," "substantially," "generally," and "approximately" are used to indicate a possible variation of ±10% in a stated value.

As used herein, the terms "transmit," "provide," "receive," and "obtain" may refer to the transfer or communication of data, information, or signals between various components or entities. This may include, but is not limited to, transmission over a network (such as a local area network, wide area network, or the Internet), transfer between devices (such as between computers, smartphones, or other electronic devices), communication between central processing units (CPUs) or graphics processing units (GPUs), exchange of information between microservices, transfer of data between software components within an environment, or any other form of data transfer or communication as indicated by the context in which the terms are used. The specific mode or medium of transmission or provision may vary depending on the particular implementation and system architecture.

As used herein, the term "module" may refer to software code, a software component, a software function, a software application, and firmware. As indicated by context, "module" may be logical, digital, analog, optical, electronic, or quantum implementations of operations or functions. A module may be implemented as a standalone unit or as part of a larger system. In some cases, a module may interact with other modules or components to perform specific tasks or operations within the system. As indicated by context or based on design preference, any two modules may be combined. As indicated by context or based on design preference, any module may be broken into two or more modules that provide some or all of the operations or functions of the single module. The specific implementation of module(s) may vary depending on the requirements of the system and the particular application.

The term "exemplary" is used in the sense of "example" rather than "ideal." As used herein, the singular forms "a," "an," and "the" include plural reference unless the context dictates otherwise.

7. Examples

Exemplary embodiments of the systems and methods disclosed herein are described in the numbered paragraphs below.

A1. A system for integrated application and scheduling platform with efficient and accurate matching, comprising: a user interface facilitating application submission, match display, and scheduling; a database to store and manage access to candidate profiles, job listings, and scheduling data; and a matching and scheduling module designed to automate the matching process and facilitate direct interview scheduling based on real-time employer availability.

A2. The system of A1, wherein the user interface provides interactive feedback to candidates about their scheduled first-round interviews, including automated confirmation notifications, adaptive reminders based on scheduled interview dates and times, and real-time updates on changes to the scheduled interviews.

A3. The system of any of A1-A2, further comprising a security module implementing security protocols to protect data integrity and confidentiality across all subsystems.

A4. The system of any of A1-A3, further comprising a feedback loop mechanism that collects and analyzes post-interview feedback from candidates and employers to continuously improve the matching and scheduling algorithms.

A5. The system of any of A1-A4, wherein the matching and scheduling module incorporates AI-driven resume parsing to automatically extract and validate information from uploaded candidate documents, enhancing the accuracy of candidate profiles and job matches.

A6. The system of any of A1-A5, further comprising a modular API framework allowing integration with third-party calendars and HR tools, extending the system's functionality and enhancing the user experience for both candidates and employers.

A7. The system of any of A1-A6, wherein the matching and scheduling module uses a combination of fixed and fuzzy matching techniques to match candidates with job opportunities.

A8. The system of A8, wherein the fixed matching techniques compare exact values for criteria including location preferences, required qualifications, and salary range.

A9. The system of A8, wherein the fuzzy matching techniques analyze text-based data including job titles, skills, and job descriptions to identify relevant matches.

A10. The system of any of A1-A9, wherein the matching and scheduling module employs vectorization techniques to convert text-based data into vectors for efficient comparison and analysis.

A11. The system of A11, wherein the vectorization techniques include converting user text segments from candidate profiles and posting text segments from job listings into high-dimensional vectors.

A12. The system of A11, wherein the vectorization techniques include: extracting relevant keywords and phrases from text-based data; assigning numerical values to the extracted keywords and phrases based on their frequency and importance; and generating a multi-dimensional vector representation of the text-based data using the assigned numerical values.

A13. The system of any of A1-A12, wherein the matching and scheduling module applies vector functions to compare user vectors and posting vectors to determine the similarity between candidate profiles and job postings.

A14. The system of any of A1-A13, wherein the matching and scheduling module filters job postings in multiple stages, including an initial filtering based on parameters and a subsequent filtering based on vector comparisons.

A15. The system of any of A1-A14, wherein the matching and scheduling module applies parameter functions to compare user parameters and posting parameters to determine the relevance of job postings for a user.

A16. The system of A14, wherein the vector functions calculate similarity scores between user vectors and posting vectors, and the matching and scheduling module ranks job postings based on these similarity scores.

A17. The system of A16, wherein the similarity scores are calculated using cosine similarity between the user vectors and posting vectors.

A18. The system of A16, wherein the matching and scheduling module applies clustering algorithms to group similar user vectors and posting vectors, facilitating efficient matching between candidates and job postings within the same cluster.

A19. The system of A16, wherein the matching and scheduling module assigns different weights to various components of the user vectors and posting vectors based on their relative importance in determining job suitability.

A20. A computer-implemented method for integrated job application processing and interview scheduling, the computer-implemented comprising: receiving, by a processor, user data for a candidate through a user interface; extracting, by the processor, user parameters and user text segments from the user data; converting, by the processor, the user text segments into user vectors using vectorization techniques; storing, by the processor, the user parameters and user vectors in a database associated with a user ID; obtaining, by the processor, posting data for job listings; extracting, by the processor, posting parameters and posting text segments from the posting data; converting, by the processor, the posting text segments into posting vectors using vectorization techniques; storing, by the processor, the posting parameters and posting vectors in the database associated with a posting ID; evaluating, by the processor, a match trigger to initiate a matching process; upon detecting the match trigger, obtaining, by the processor, a first set of postings; filtering, by the processor, the first set of postings to a second set of postings using the user parameters, posting parameters, and parameter functions; filtering, by the processor, the second set of postings to a third set of postings using the user vectors, posting vectors, and vector functions; outputting, by the processor, the third set of postings through the user interface; receiving, by the processor, a selection of a job posting from the third set of postings; retrieving, by the processor, real-time availability data for an employer associated with the selected job posting; presenting, by the processor, available interview time slots based on the real-time availability data; receiving, by the processor, a selection of an interview time slot; scheduling, by the processor, an interview for the selected time slot; sending, by the processor, automated notifications to the candidate and the employer about the scheduled interview; collecting, by the processor, post-interview feedback from the candidate and the employer; and updating, by the processor, the matching process based on the collected feedback to improve future matching accuracy.

Other aspects of the disclosure will be apparent to those skilled in the art from consideration of the specification and practice of the invention disclosed herein. It is intended that the specification and examples be considered as exemplary only, with a true scope and spirit of the invention being indicated by the following claims.

What is claimed is:

1. A system for integrated application and scheduling platform with efficient and accurate matching, comprising:
    at least one memory configured to store instructions; and
    at least one processor configured to execute the instructions to perform operations, wherein the operations include:
    receive user data for a candidate through a user interface;
    extract user parameters and user text segments from the user data;
    convert the user text segments into user vectors using vectorization techniques;
    store the user parameters and user vectors in a database associated with a user ID;
    obtain posting data for job listings;
    extract posting parameters and posting text segments from the posting data;
    convert the posting text segments into posting vectors using vectorization techniques;
    store the posting parameters and posting vectors in the database associated with a posting ID;
    evaluate a match trigger to initiate a matching process;
    implement a machine learning model to improve the matching process comprising:
        upon detecting the match trigger, obtain a first set of postings;
        filter the first set of postings to a second set of postings using the user parameters, posting parameters, and parameter functions;
        filter the second set of postings to a third set of postings using the user vectors, posting vectors, and vector functions;
        wherein the vector functions use the machine learning model trained on historical matching data to predict the likelihood of successful matches between the user vectors and the posting vectors;
        calculate a composite score for each posting based on a weighted sum of a threshold cosine similarity value between the user vectors and the posting vectors;
        output the third set of postings through the user interface based on the predicted likelihood of the successful matches between the user vectors and the posting vectors;
    receive a selection of a job posting from the third set of postings;
    retrieve real-time availability data for an employer associated with the selected job posting;
    present available interview time slots based on the real-time availability data;
    receive a selection of an interview time slot;
    schedule an interview for the selected time slot;
    send automated notifications to the candidate and the employer about the scheduled interview;
    collect post-interview feedback from the candidate and the employer; and
    update the matching process based on the collected feedback to improve future matching accuracy,
    wherein updating the matching process includes: adjusting one or more parameters to update the machine learning model based on a difference between the predicted set of postings and the collected post-interview feedback from the candidate and the employer; and executing the updated machine learning model based on the adjusted one or more parameters.

2. The system of claim 1, wherein presenting the available interview time slots including using a user interface that provides interactive feedback to candidates about their scheduled first-round interviews, including automated confirmation notifications, adaptive reminders based on scheduled interview dates and times, and real-time updates on changes to scheduled interviews.

3. The system of claim 1, wherein the instructions implement security module implementing security protocols to protect data integrity and confidentiality across all subsystems.

4. The system of claim 1, wherein updating the matching process includes a feedback loop mechanism that collects and analyzes post-interview feedback from candidates and employers to continuously improve the matching process.

5. The system of claim 1, wherein extracting the user parameters and the user text segments uses AI-driven resume parsing to automatically extract and validate information from uploaded candidate documents, enhancing an accuracy of candidate profiles and job matches.

6. The system of claim 1, wherein the instructions implement a modular API framework allowing integration with third-party calendars and HR tools.

7. The system of claim 1, wherein the matching process uses a combination of fixed matching techniques and fuzzy matching techniques to match candidates with job opportunities.

8. The system of claim 7, wherein the fixed matching techniques compare exact values for criteria including location preferences, required qualifications, and salary range.

9. The system of claim 7, wherein the fuzzy matching techniques analyze text-based data including job titles, skills, and job descriptions to identify relevant matches.

10. The system of claim 1, wherein the matching process employs vectorization techniques to convert text-based data into the vectors for efficient comparison and analysis.

11. The system of claim 10 wherein the vectorization techniques include converting user text segments from candidate profiles and posting text segments from job listings into high-dimensional vectors for the vectors.

12. The system of claim 11, wherein the vectorization techniques include:
    extracting relevant keywords and phrases from text-based data;
    assigning numerical values to the extracted keywords and phrases based on their frequency and importance; and
    generating a multi-dimensional vector representation of the text-based data using the assigned numerical values.

13. The system of claim 1, wherein the matching process applies the vector functions to compare user vectors and posting vectors to determine the similarity between candidate profiles and job postings.

14. The system of claim 1, wherein the matching process filters job postings in multiple stages, including at least filter the first set of postings and filter the second set of postings.

15. The system of claim 1, wherein the matching process applies parameter functions, to filter the first set of postings, to compare user parameters and posting parameters to determine a relevance of job postings for a user.

16. The system of claim 14, wherein the vector functions calculate similarity scores between user vectors and posting vectors, and the matching process ranks job postings based on these similarity scores.

17. The system of claim 16, wherein the similarity scores are calculated using cosine similarity between the user vectors and posting vectors.

18. The system of claim 16, wherein the matching process applies clustering algorithms to group similar user vectors and posting vectors, facilitating efficient matching between candidates and job postings within a same cluster.

19. The system of claim 16, wherein the matching process assigns different weights to various components of the user vectors and posting vectors based on their relative importance in determining job suitability.

20. A computer-implemented method for integrated job application processing and interview scheduling, the computer-implemented comprising:
 receiving, by a processor, user data for a candidate through a user interface;
 extracting, by the processor, user parameters and user text segments from the user data;
 converting, by the processor, the user text segments into user vectors using vectorization techniques;
 storing, by the processor, the user parameters and user vectors in a database associated with a user ID;
 obtaining, by the processor, posting data for job listings;
 extracting, by the processor, posting parameters and posting text segments from the posting data;
 converting, by the processor, the posting text segments into posting vectors using vectorization techniques;
 storing, by the processor, the posting parameters and posting vectors in the database associated with a posting ID;
 evaluating, by the processor, a match trigger to initiate a matching process;
 implementing a machine learning model to improve the matching process comprising:
  upon detecting the match trigger, obtaining, by the processor, a first set of postings;
  filtering, by the processor, the first set of postings to a second set of postings using the user parameters, posting parameters, and parameter functions;
  filtering, by the processor, the second set of postings to a third set of postings using the user vectors, posting vectors, and vector functions;
  wherein the vector functions use the machine learning model trained on historical matching data to predict the likelihood of successful matches between the user vectors and the posting vectors;
  calculating a composite score for each posting based on a weighted sum of a threshold cosine similarity value between the user vectors and the posting vectors;
  outputting, by the processor, the third set of postings through the user interface based on the predicted likelihood of the successful matches between the user vectors and the posting vectors;
 receiving, by the processor, a selection of a job posting from the third set of postings;
 retrieving, by the processor, real-time availability data for an employer associated with the selected job posting;
 presenting, by the processor, available interview time slots based on the real-time availability data;
 receiving, by the processor, a selection of an interview time slot;
 scheduling, by the processor, an interview for the selected time slot;
 sending, by the processor, automated notifications to the candidate and the employer about the scheduled interview;
 collecting, by the processor, post-interview feedback from the candidate and the employer; and
 updating, by the processor, the matching process based on the collected feedback to improve future matching accuracy wherein the updating comprises: adjusting one or more parameters to update the machine learning model based on a difference between the predicted set of postings and the collected post-interview feedback from the candidate and the employer; and executing the updated machine learning model based on the adjusted one or more parameters.

* * * * *